(12) United States Patent
Zander et al.

(10) Patent No.: US 12,368,496 B2
(45) Date of Patent: Jul. 22, 2025

(54) POLARIZATION DEPENDENT OPERATION OF A RE-CONFIGURABLE RELAYING DEVICE

(71) Applicant: Sony Group Corporation, Tokyo (JP)

(72) Inventors: Olof Zander, Södra Sandby (SE); Erik Bengtsson, Eslöv (SE); Fredrik Rusek, Eslöv (SE); Jose Flordelis, Lund (SE); Kun Zhao, Malmö (SE)

(73) Assignee: Sony Group Corporation, Tokyo (JP)

( * ) Notice: Subject to any disclaimer, the term of this patent is extended or adjusted under 35 U.S.C. 154(b) by 362 days.

(21) Appl. No.: 18/024,564

(22) PCT Filed: Sep. 14, 2021

(86) PCT No.: PCT/EP2021/075180
§ 371 (c)(1),
(2) Date: Mar. 3, 2023

(87) PCT Pub. No.: WO2022/058296
PCT Pub. Date: Mar. 24, 2022

(65) Prior Publication Data
US 2023/0361853 A1    Nov. 9, 2023

(30) Foreign Application Priority Data
Sep. 17, 2020 (SE) .................... 2030291-5

(51) Int. Cl.
*H04B 7/10* (2017.01)
*H04B 7/04* (2017.01)
(Continued)

(52) U.S. Cl.
CPC .......... *H04B 7/10* (2013.01); *H04B 7/04013* (2023.05); *H04B 7/0617* (2013.01); *H04B 7/15528* (2013.01)

(58) Field of Classification Search
CPC .... H04B 7/10; H04B 7/04013; H04B 7/0617; H04B 7/15528
See application file for complete search history.

(56) References Cited

U.S. PATENT DOCUMENTS

2008/0159200 A1* 7/2008 Lee ..................... H04B 7/10
370/315
2010/0001918 A1   1/2010 Svensson et al.
(Continued)

FOREIGN PATENT DOCUMENTS

| EP | 2301168 A | 3/2011 |
| EP | 2740286 A | 6/2014 |
| WO | 2015169368 A1 | 11/2015 |

OTHER PUBLICATIONS

International Search Report and Written Opinion from corresponding International Application No. PCT/EP2021/075180, mailed on Jan. 7, 2022, 12 pages.

(Continued)

*Primary Examiner* — Dady Chery
(74) *Attorney, Agent, or Firm* — Tucker Ellis LLP

(57) ABSTRACT

Examples relate to a method of operating a first communication node (CN). The first CN is configured for controlling a re-configurable relaying device (RRD), in particular a re-configurable reflective device, the RRD being reconfigurable to provide multiple contemporaneous spatial polarization filterings, each one of the multiple spatial polarization filterings being associated with a respective input spatial direction from which incident signals on a radio channel are accepted and with a respective output spatial direction into (Continued)

which the incident signals are transmitted, in particular reflected, by the RRD. The method comprising providing, to a second CN, a message indicative of the RRD being configurable to transmit an incident signal from a second CN using an output spatial direction to the first CN depending on a property of the incident signal. Further examples, relate to methods of operating the second CN and the RRD. Still further examples, relate to corresponding first CNs, second CNs and RRDs.

19 Claims, 8 Drawing Sheets

(51) Int. Cl.
*H04B 7/06* (2006.01)
*H04B 7/155* (2006.01)

(56) References Cited

U.S. PATENT DOCUMENTS

| | | | |
|---|---|---|---|
| 2012/0258729 A1* | 10/2012 | Siomina | G01S 5/08 |
| | | | 455/456.1 |
| 2013/0082867 A1* | 4/2013 | Malaga | H04B 1/1081 |
| | | | 342/40 |
| 2020/0221384 A1* | 7/2020 | Ang | H04W 52/0229 |
| 2022/0231753 A1* | 7/2022 | Bengtsson | H04B 7/145 |

OTHER PUBLICATIONS

Office Action and Search Report from corresponding Swedish Application No. 2030291-5, mailed on May 28, 2021, 8 pages.
Hongyu Li et al., "Intelligent Reflecting Surface Enhanced Wideband MIMO-OFDM Communications: From Practical Model to Reflection Optimization", Jul. 26, 2020, 14 pages.
Emil Bjornson et al., "Reconfigurable Intelligent Surfaces: Three Myths and Two Critical Questions", Jun. 5, 2020, 7 pages.
Huanhuan Yang et al., "A programmable metasurface with dynamic polarization, scattering and focusing control", Scientific Reports, vol. 6:35692, Oct. 24, 2016, 11 pages.
Linglong Dai et al., "Reconfigurable Intelligent Surface-Based Wireless Communications: Antenna Design, Prototyping, and Experimental Results", IEEE Access, vol. 8:45913, Mar. 16, 2020, 11 pages.
Ohyun Jo et al., "Exploitation of Dual-Polarization Diversity for 5G Millimeter-Wave MIMO Beamforming Systems", IEEE Transactions on Antennas and Propagation, vol. 65, No. 12, Dec. 12, 2017, 10 pages.
Simone Montori et al., "Reconfigurable and Dual-Polarization Folded Reflectarray Antenna", 2012 42nd European Microwave Conference, pp. 735-738, Oct. 29-Nov. 1, 2012.
Sean Victor Hum et al., "Reconfigurable Reflectarrays and Array Lenses for Dynamic Antenna Beam Control: A Review", IEEE Transactions on Antennas and Propagation, vol. 62, No. 1, Jan. 1, 2014, 16 pages.

* cited by examiner

POLARIZATION DEPENDENT OPERATION OF A RE-CONFIGURABLE RELAYING DEVICE

TECHNICAL FIELD

Examples relate to communication between communication nodes using re-configurable relaying devices, in particular re-configurable reflective devices.

BACKGROUND

In order to increase a coverage area for wireless communication, it is envisioned to use re-configurable relaying devices (RRD), in particular re-configurable reflective devices. Re-configurable reflective devices are sometimes also referred to as reflecting large intelligent surfaces (LIS). See, e.g., Sha Hu, Fredrik Rusek, and Ove Edfors. "Beyond massive MIMO: The potential of data transmission with large intelligent surfaces." IEEE Transactions on Signal Processing 66.10 (2018): 2746-2758.

An RRD can be implemented by an array of antennas that can reflect incident electromagnetic waves/signals. The array of antennas can be semi-passive. Semi-passive can correspond to a scenario in which the antennas do not provide signal amplification, but can impose a variable phase shift to the incident electromagnetic waves. An input spatial direction from which incident signals on a radio channel are accepted and an output spatial direction into which the incident signals are reflected can be re-configured, by changing a phase relationship between the antennas.

Communication nodes may use dually polarized signals for data transmission.

Polarization single-user MIMO (multi-input multi-output) is fairly well researched. The core benefit of polarization MIMO is that a single spatial beam direction can be used with two transmission layers—one per polarization.

MIMO may be broadly classified into two scenarios, a single-user scenario (also known as point-to-point scenario or single-user MIMO) and a multi-user scenario (also known as multi-user MIMO). In single-user MIMO, the receive antennas are physically located at the same device, while in multi-user MIMO the receive antennas belong to different devices.

In single-user MIMO, the AN (e.g., a gNB or a base station (BS) as specified by 3GPP) needs to form a single spatial beam towards the UE, in which the AN can transmit two layers of data, one per polarization. Thus, the overhead at the AN for transmitting two layers of data, one per polarization, is limited to tracking the beam direction. However, tracking the beam direction needs to be carried out no matter if multiple layers are used or not.

In multi-user MIMO, the situation is drastically different. There are two cases, (i) the two UEs to be served can be served by the same spatial beam send from the AN, or (ii) the two UEs are far apart so that two different spatial beam directions are needed. Both cases may be challenging.

SUMMARY

For case (i) above, the AN needs to separate the two layers within the beam, so that interference is reduced/eliminated at the UEs. This can for example be implemented by polarization multiplexing at the AN. The overhead of doing so may lead the resource scheduler not to engage in multi-user MIMO.

Accordingly, there may be a need of improved techniques for communication between communication nodes, CN, using dually polarized signals.

Said need is addressed with the subject-matter of the independent claims. The dependent claims define advantageous examples.

Examples relate to a method of operating a first communication node (CN). The first CN is configured for controlling a re-configurable relaying device (RRD), in particular a re-configurable reflective device, the RRD being reconfigurable to provide multiple contemporaneous spatial polarization filterings, each one of the multiple spatial polarization filterings being associated with a respective input spatial direction from which incident signals on a radio channel are accepted and with a respective output spatial direction into which the incident signals are transmitted, in particular reflected, by the RRD. The method comprising providing, to a second CN, a message indicative of the RRD being configurable to transmit an incident signal from the second CN using an output spatial direction to the first CN depending on a property of the incident signal.

Further examples relate to a method of operating a second communication node (CN). The second CN is configured to communicate with a first CN via a re-configurable relaying device (RRD), in particular a re-configurable reflective device, the RRD being reconfigurable to provide multiple contemporaneous spatial polarization filterings, each one of the multiple spatial polarization filterings being associated with a respective input spatial direction from which incident signals on a radio channel are accepted and with a respective output spatial direction into which the incident signals are transmitted, in particular reflected, by the RRD. The method comprises obtaining, from the first CN, a message indicative of the RRD being configurable to transmit an incident signal from the second CN using an output spatial direction to the first CN depending on a property of the incident signal.

Still further examples relate to a method of operating a re-configurable relaying device (RRD), in particular a re-configurable reflective device, the RRD being reconfigurable to provide multiple contemporaneous spatial polarization filtering, each one of the multiple spatial polarization filterings being associated with a respective input spatial direction from which incident signals on a radio channel are accepted and with a respective output spatial direction into which the incident signals are transmitted, in particular reflected, by the RRD. The method comprises providing, to a first CN, a message indicative of the RRD being configurable to transmit an incident signal from a second CN using an output spatial direction to the first CN depending on the input polarization of the incident signal.

Other examples provide a method of operating a first communication node (CN). The first CN is configured for controlling a re-configurable relaying device (RRD), in particular a re-configurable reflective device, the RRD being reconfigurable to provide multiple contemporaneous spatial polarization filterings, each one of the multiple spatial polarization filterings being associated with a respective input spatial direction from which incident signals on a radio channel are accepted and with a respective output spatial direction into which the incident signals are transmitted, in particular reflected, by the RRD. The method comprises providing, to a second CN, a message indicative of the RRD being configurable to transmit an incident signal from the first CN in an output spatial direction to the second CN with an output polarization depending on a property of the incident signal.

Further examples, provide a method of operating a second communication node (CN). The second CN is configured to communicate with a first CN via a re-configurable relaying device (RRD), in particular a re-configurable reflective device, the RRD being reconfigurable to provide multiple contemporaneous spatial polarization filterings, each one of the multiple spatial polarization filterings being associated with a respective input spatial direction from which incident signals on a radio channel are accepted and with a respective output spatial direction into which the incident signals are transmitted, in particular reflected, by the RRD. The method comprises obtaining, from a first CN, a message indicative of the RRD being configurable to transmit an incident signal from the first CN in an output spatial direction to the second CN with an output polarization depending on a property of the incident signal.

Still further examples provide a method of operating a re-configurable relaying device (RRD), in particular a re-configurable reflective device, the RRD being reconfigurable to provide multiple contemporaneous spatial polarization filterings, each one of the multiple spatial polarization filterings being associated with a respective input spatial direction from which incident signals on a radio channel are accepted and with a respective output spatial direction into which the incident signals are transmitted, in particular reflected, by the RRD. The method comprises providing, to a first communication node (CN) a message indicative of the RRD being configured to transmit an incident signal from the first CN in output spatial direction to a second CN with an output polarization depending on a property of the incident signal.

Other examples provide a first communication node (CN), wherein a control circuitry of the first CN is configured for causing the first CN to perform any of the aforementioned methods.

Further examples provide a second communication node (CN), wherein a control circuitry of the second CN is configured for causing the second CN to perform any of the aforementioned methods.

Still further examples provide a re-configurable relaying device (RRD), in particular a re-configurable reflective device, the RRD being reconfigurable to provide multiple contemporaneous spatial polarization filtering, each one of the multiple spatial polarization filterings being associated with a respective input spatial direction from which incident signals on a radio channel are accepted and with a respective output spatial direction into which the incident signals are transmitted, in particular reflected, by the RRD, wherein a control circuitry of the RRD causes the RRD to perform any of the aforementioned methods.

It is to be understood that the features mentioned above and those yet to be explained below may be used not only in the respective combinations indicated, but also in other combinations or in isolation without departing from the scope of the invention.

DETAILED DESCRIPTION

Figure 1:
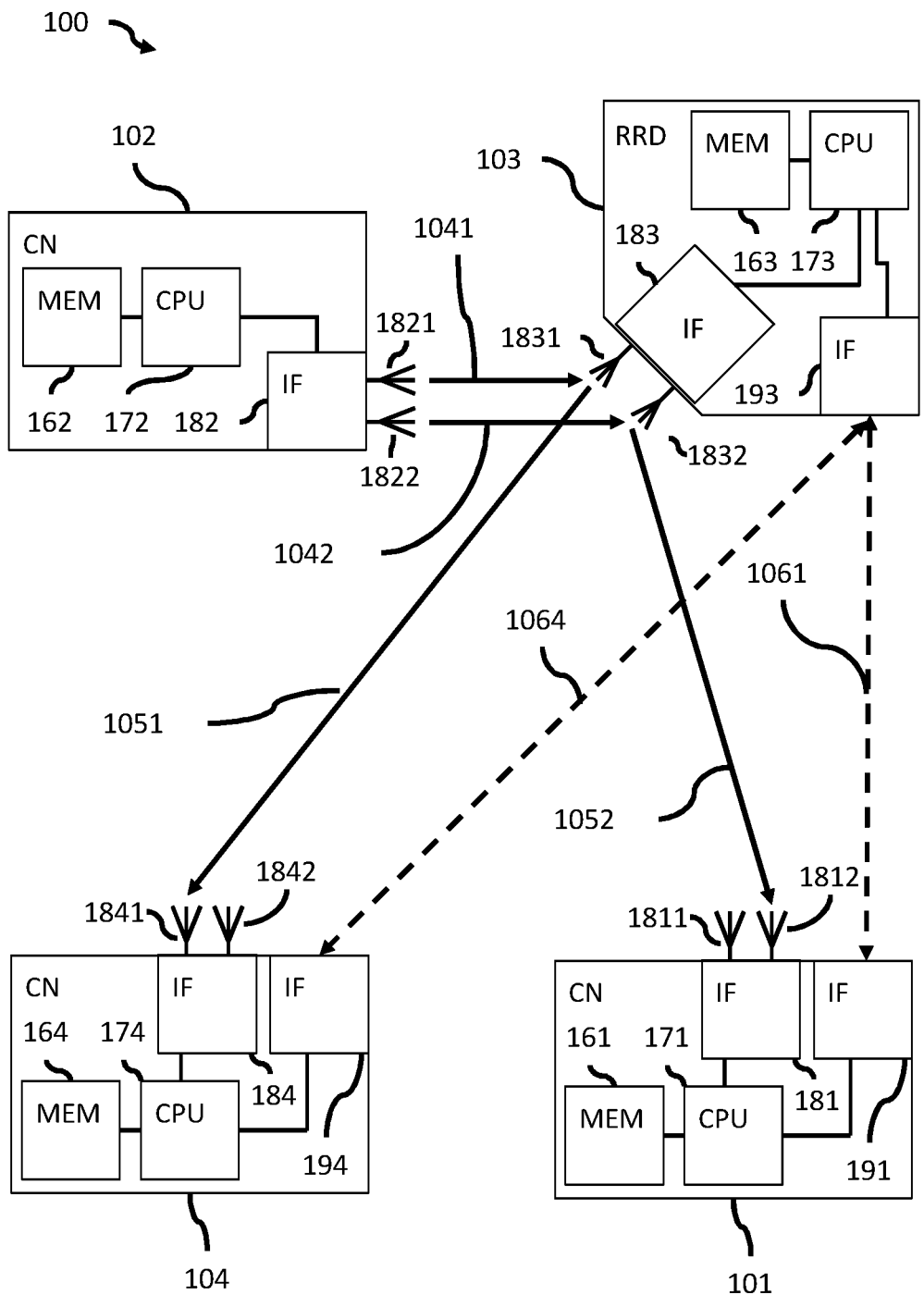
FIG. 1 schematically illustrates a communication system according to a first scenario.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, examples of the disclosure will be described in detail with reference to the accompanying drawings. It is to be understood that the following description of examples is not to be taken in a limiting sense. The scope of the disclosure is not intended to be limited by the examples described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Techniques are described that facilitate wireless communication between communication nodes. In some examples, the wireless communication system can be implemented by a wireless communication network, e.g., a radio-access network (RAN) of a Third Generation Partnership Project (3GPP)-specified cellular network (NW). In such case, one communication node can be implemented by a base station (BS) of the RAN, and one or more further communication nodes can be implemented by terminals (also referred to as user equipment, UE).

According to examples, a first communication node, CN, can communicate with at least a second CN via an RRD.

The RRD may include an antenna array. The RRD may include a meta-material surface. In examples, an RRD may include a reflective antenna array (RAA).

There are many schools-of-thought for how RRDs should be integrated into 3GPP-standardized RANs.

In an exemplary case, the NW operator has deployed the RRDs and is therefore in full control of the RRD operations. The UEs, on the other hand, may not be aware of the presence of any RRD, at least initially, i.e., it is transparent to a UE whether it communicates directly with the BS or via an RRD. The RRD essentially functions as a coverage-extender of the BS. The BS may have established a control link with the RRD.

According to another exemplary case, it might be a private user or some public entity that deploys the RRD. Further, it may be that the UE, in this case, controls RRD operations. The BS, on the other hand, may not be aware of the presence of any RRD and, moreover, may not have control over it/them whatsoever. The UE may gain awareness of the presence of RRD by means of some short-range radio technology, such as Bluetooth, wherein Bluetooth may refer to a standard according to IEEE 802.15, or WiFi, wherein WiFi may refer to a standard according to IEEE 802.11, by virtue of which it may establish the control link with the RRD.

In the following it may be assumed that the first CN is configured for controlling the RRD. In some examples, the first CN may thus correspond to the BS and in other examples the first CN may correspond to the UE.

FIG. 1 schematically illustrates a communication system 100. The communication system 100 includes a first communication node, CN, 101, a second CN 102 and a third CN 104. The first CN 101 and the second CN 102 are configured to communicate with each other via a radio channel and the first CN 101 and the third CN 104 are configured to communicate with each other via a radio channel. Radio channel may refer to a radio channel specified by the 3GPP standard. In particular, radio channel may refer to a physical radio channel. The radio channel may offer several time/frequency-resources for communication between different nodes of the communication system 100. In the example of FIG. 1, the second CN 102 may be implemented by an access node (AN), more specifically a BS, and the first CN 101 and the third CN 104 may be implemented by a UE. The BS 102 can be part of a cellular NW (not shown in FIG. 1).

As a general rule, the techniques described herein could be used for various types of communication systems, e.g., also for peer-to-peer communication, etc. For sake of simplicity, however, hereinafter, various techniques may be described in the context of a communication system that is implemented by a BS 102 of a cellular NW and UEs 102, 104.

The first CN 101 may include control circuitry 171, memory circuitry 161, in particular non-volatile memory, 161, and interface circuitry 181. The interface circuitry 181 may be adapted for controlling transmission/reception of signals having a first polarization on a radio channel via a first antenna group 1811 comprising one or more antennas and signals having a second polarization on the radio channel via a second antenna group 1812 comprising one or more antennas. The first polarization may be different from the second polarization. In particular, the first polarization may be orthogonal to the second polarization. In examples, the first polarization may be a horizontal polarization and the second polarization may be a vertical polarization. In other examples, the first polarization may be a right-handed circular polarization and the second polarization may be a left-handed circular polarization. It is also conceivable that the first polarization and the second polarization are orthogonal elliptical polarizations. The control circuitry 171 may be implemented by a processor 171. The processor 171 may be configured to load program code that is stored in the memory 161. The processor 171 may then execute the program code. Executing the program code may cause the processor to perform techniques as described herein. Due to its capability to transmit signals using a first and a second polarization, the first CN 101 may also be considered as dually polarized CN. The first CN 101 may further comprise interface circuitry 191 for controlling the RRD 103 on a radio channel 1061. The radio channel may be different from the radio channel used for communication via the RRD 103. The radio channel 1061 may also be called RRD control radio channel to distinguish the radio channel 1061 from the other radio channel. The RRD control radio channel 1061 may particularly relate to a radio channel used for a short-range radio technology such as Bluetooth or WiFi. In other examples, the radio channel for controlling the RRD may be the same as or similar to the radio channel used for communication via the RRD 103.

Correspondingly, the third CN 104 may include control circuitry 174, memory circuitry 164, in particular non-volatile memory, 164, and interface circuitry 184. The interface circuitry 184 may be adapted for controlling transmission/reception of signals having a first polarization on a radio channel via a first antenna group 1841 comprising one or more antennas and signals having a second polarization on the radio channel via a second antenna group 1842 comprising one or more antennas. The first polarization may be different from the second polarization. In particular, the first polarization may be orthogonal to the second polarization. In examples, the first polarization may be a horizontal polarization and the second polarization may be a vertical polarization. In other examples, the first polarization may be a right-handed circular polarization and the second polarization may be a left-handed circular polarization. It is also conceivable that the first polarization is a right-handed elliptical polarization and the second polarization is a left-handed elliptical polarization. The control circuitry 174 may be implemented by a processor 174. The processor 174 may be configured to load program code that is stored in the memory 164. The processor 174 may then execute the program code. Executing the program code may cause the processor to perform techniques as described herein. Due to its capability to transmit signals using a first and a second polarization, the third CN 104 may also be considered as dually polarized CN. The third CN 104 may further comprise interface circuitry 194 for controlling the RRD 103 on a radio channel 1064. The radio channel may be different from the radio channel used for communication via the RRD 103. The radio channel 1064 may also be called RRD control radio channel to distinguish the radio channel 1064 from the other radio channel. The RRD control radio channel 1064 may particularly relate to a radio channel used for a short-range radio technology such as Bluetooth or WiFi.

Similarly, the second CN 102 may include control circuitry 172, memory circuitry 162, in particular non-volatile memory, 162, and interface circuitry 182. The interface circuitry 182 may be adapted for controlling transmission/reception of signals having a third polarization on a radio channel 1041 via a first antenna group 1821 comprising one or more antennas and signals having a fourth polarization on the radio channel 1042 via second antenna group 1822. The third polarization may be different from the fourth polarization. In particular, the third polarization may be orthogonal to the fourth polarization. In examples, the third polarization may be a horizontal polarization and the fourth polarization may be a vertical polarization. In other examples, the third polarization may be a right-handed circular polarization and the fourth polarization may be a left-handed circular polarization. It is also conceivable that the third polarization is a right-handed elliptical polarization and the fourth polarization is a left-handed elliptical polarization. The control circuitry 172 may be implemented by a processor 172. The processor 172 may be configured to load program code that is stored in the memory 162. The processor 172 may then execute the program code. Executing the program code may cause the processor to perform techniques as described herein. Due to its capability to transmit signals using a third and a fourth polarization, the second CN 102 may also be considered as dually polarized CN.

The RRD 103 may include control circuitry 173, memory circuitry 163, in particular non-volatile memory, 163, and interface circuitry 183. The interface circuitry 183 may be adapted for controlling accepting/transmitting of signals having a fifth polarization 1821, 1051 via a first antenna group 1831 comprising one or more antennas and signals having a sixth polarization 1042, 1812 on the radio channel via second antenna group 1832. The fifth polarization may be different from the sixth polarization. In particular, the fifth polarization may be orthogonal to the sixth polarization. The polarizations may be linear, circular or elliptical polarizations. The control circuitry 173 may be implemented by a processor 173. The processor 173 may be configured to load program code that is stored in the memory 163. The processor 173 may then execute the program code. Executing the program code may cause the processor to perform techniques as described herein. The RRD 103 may further comprise interface circuitry 183 for being controlled by the first CN 101 and/or the third CN 104 via signals 1061, 1064, respectively.

While the scenario of FIG. 1 illustrates the antenna groups 1811, 1812, 1821, 1822, 1831, 1832, 1841, 1842 being coupled to the first CN 101 and the second CN 102, respectively, as a general rule, it would be possible to employ transmit-receive points (TRPs) that are spaced apart from the first CN 101 and/or the second CN 102.

The interfaces 181, 182, 184 may each include one or more TX chains and one or more RX chains. For instance, such RX chains can include low noise amplifiers, analogue to digital converters, mixers, etc. Analogue and/or digital beamforming would be possible. Thereby, phase-coherent transmitting and/or receiving (communicating) can be implemented across the multiple antenna groups 1811, 1812, 1821, 1822, 1841, 1842. Thereby, the first CN 101, the second CN 102 and the third CN 104 may selectively transmit on multiple TX beams (beamforming), to thereby direct energy into distinct spatial directions.

By using a TX beam, the direction of the wavefront of signals transmitted by a transmitter of the communication system is controlled. Energy is focused into a respective direction or even multiple directions, by phase-coherent superposition of the individual signals originating from each antenna group 1811, 1812, 1821, 1841, 1842. Thereby, the spatial data stream can be directed. The spatial data streams transmitted on multiple beams can be independent, resulting in spatial multiplexing multi-antenna transmission; or dependent on each other, e.g., redundant, resulting in diversity transmission or diversity multi-input multi-output transmission. As a general rule, alternatively or additionally to such TX beams, it is possible to employ receive (RX) beams.

The RRD 103 may include a phased array of antennas that impose a configurable phase shift when reflecting incident signals. This defines respective spatial filters that are associated with spatial directions into which the incident signals are reflected. The antennas can be passive or semi-passive elements that do not provide any amplification. The RRD 103 thus provides coverage extension by reflection of radio-frequency (RF) signals. A translation to the baseband may not be required. This is different, to, e.g., decode-and-forward repeater or relay functionality. This is only one example implementation of the RRD. Other implementations are conceivable. For example, a meta-material surface not including distinct antenna elements may be used. The meta-material can have a configurable refraction index. To provide a re-configurable refractive index, the meta-material may be made of repetitive tunable structures, in particular as periodic tunable structures that have extensions smaller than the wavelength of the incident RF signals.

Thus, the RRD may comprise a plurality of reflective elements, in particular polarized reflective elements.

In general, an RRD may be implemented with an array of antenna elements, where each element may be tuned to reflect an incoming electromagnetic wave with similar or the same properties, in terms of phase, amplitude and polarization. This may also be considered as a phased antenna array.

In the case the RRD is implemented as a meta material, individual unit cells of the RRD, e.g. the aforementioned repetitive tunable structures, may be resonant. These unit cells may be significantly smaller than a wavelength of the electromagnetic wave to be reflected. The unit cells may be jointly tuned to achieve the desired reflection properties of the RRD. The individual unit cells may be tuned differently to obtain the desired reflection properties of the RRD. The individual unit cells may not necessarily have to have the same properties in terms of phase shift, amplitude or polarization.

In the following reflective elements may refer to antenna elements and/or unit cells. The term polarized reflective elements may relate to the reflective elements being able to individually and/or collectively influence the polarization of the reflected electromagnetic wave.

As illustrated in FIG. 1, there can be DL communication 1042, 1052 from the second CN 102 via the RRD 103 to the first CN 101, as well as DL communication 1041, 1051 from the second CN 102 via the RRD 103 to the third CN 104. The RRD 103 may transmit, in particular reflect, incident signals in different output spatial directions based on a property of the incident signals. The property of the incident signal may be a polarization. The property of the incident signal may also be an input spatial direction of the incident signal. The incident signals 1041, 1042 may be accepted, by the RRD 103 from the same input spatial direction. Moreover, the second CN 102 may transmit the signals 1041, 1042 using the same spatial direction and/or time/frequency resource but the polarization of the signal 1041 may be different from the polarization of the signal 1042. The RRD 103 may transmit the signals 1041, 1042 in different output spatial directions 1051 and 1052 depending on the respective polarizations. It is also conceivable that the second CN 102 wants to transmit the same signal to two or more CNs. For example, the second CN 102 may transmit a (single) signal (not shown) comprising a superposition of two polarizations, and the RRD 103 may transmit the (single) signal in an output spatial direction to the first CN 101 and the third CN 104. Such a signal may also be referred to herein as broadcast signal.

Figure 2:
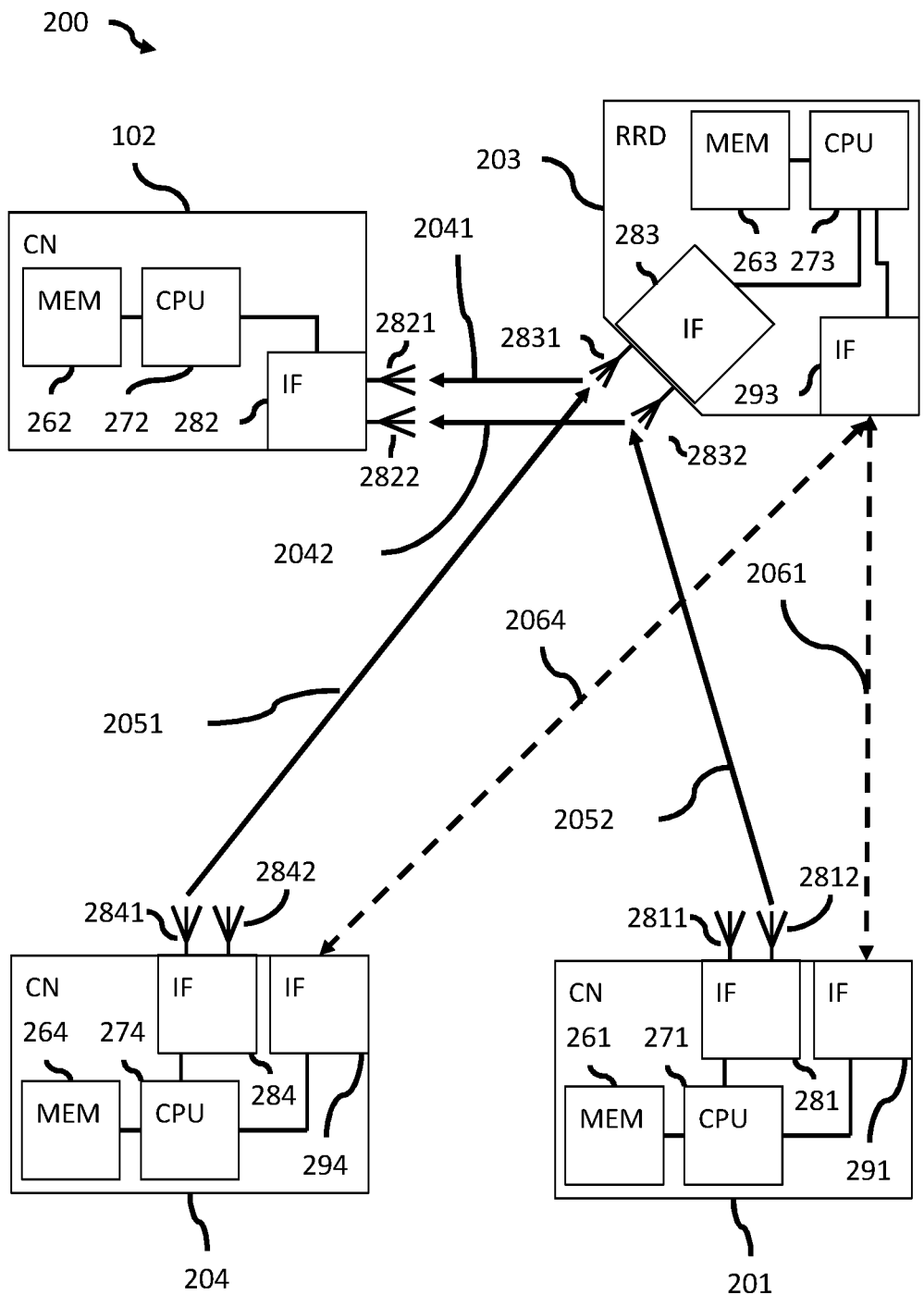
FIG. 2 schematically illustrates a communication system according to a second scenario.

FIG. 2 schematically illustrates a communication system 200. The communication system 200 includes a first CN 201, a second CN 202 and a third CN 204. The first CN 201 and the second CN 202 are configured to communicate with each other via a radio channel and the second CN 202 and the third CN 204 are configured to communicate with each other via a radio channel. The same physical radio channel may be used for the communication between the first CN 101 and the second CN 102 as well as the second CN 102 and the third CN 103, but different spatial directions may be used for transmitting/receiving the signals. In the example of FIG. 2, the second CN 202 may be implemented by an access node (AN), more specifically a BS, and the first CN 201 and the third CN 204 may be implemented by a UE. The BS 202 can be part of a cellular NW (not shown in FIG. 2).

As a general rule, the techniques described herein could be used for various types of communication systems, e.g., also for peer-to-peer communication, etc. For sake of simplicity, however, hereinafter, various techniques may be described in the context of a communication system that is implemented by a BS 202 of a cellular NW and UEs 201, 204.

The first CN 201 may include control circuitry 271, memory circuitry 261, in particular non-volatile memory, 261, and interface circuitry 281. The interface circuitry 281 may be adapted for controlling transmission/reception of signals having a first polarization on a radio channel via a first antenna group 2811 comprising one or more antennas and signals having a second polarization on the radio channel via a second antenna group 2812 comprising one or more antennas. The first polarization may be different from the second polarization. In particular, the first polarization may be orthogonal to the second polarization. In examples, the first polarization may be a horizontal polarization and the second polarization may be a vertical polarization. In other examples, the first polarization may be a right-handed circular polarization and the second polarization may be a left-handed circular polarization. It is also conceivable that the first polarization is a right-handed elliptical polarization and the second polarization is a left-handed elliptical polarization. The control circuitry 271 may be implemented by a processor 271. The processor 271 may be configured to load program code that is stored in the memory 261. The processor 271 may then execute the program code. Executing the program code may cause the processor to perform techniques as described herein. Due to its capability to transmit signals using a first and a second polarization, the first CN 201 may also be considered as dually polarized CN. The first CN 201 may further comprise interface circuitry 291 for controlling the RRD 203 on a radio channel 2061. The radio channel may be different from the radio channel used for communication via the RRD 203. The radio channel 2061 may also be called RRD control radio channel to distinguish the radio channel 2061 from the other radio channel. The RRD control radio channel 2061 may particularly relate to a radio channel used for a short-range radio technology such as Bluetooth or WiFi.

Correspondingly, the third CN 204 may include control circuitry 274, memory circuitry 264, in particular non-volatile memory, 264, and interface circuitry 284. The interface circuitry 281 may be adapted for controlling transmission/reception of signals having a first polarization on a radio channel via a first antenna group 2841 comprising one or more antennas and signals having a second polarization on the radio channel via a second antenna group 2842 comprising one or more antennas. The first polarization may be different from the second polarization. In particular, the first polarization may be orthogonal to the second polarization. In examples, the first polarization may be a horizontal polarization and the second polarization may be a vertical polarization. In other examples, the first polarization may be a right-handed circular polarization and the second polarization may be a left-handed circular polarization. It is also conceivable that the first polarization and the second polarization are orthogonal elliptical polarizations. The control circuitry 274 may be implemented by a processor 274. The processor 274 may be configured to load program code that is stored in the memory 264. The processor 274 may then execute the program code. Executing the program code may cause the processor to perform techniques as described herein. Due to its capability to transmit signals using a first and a second polarization, the third CN 104 may also be considered as dually polarized CN. The third CN 204 may further comprise interface circuitry 294 for controlling the RRD 203 on a radio channel 2064. The radio channel may be different from the radio channel used for communication via the RRD 203. The radio channel 2064 may also be called RRD control radio channel to distinguish the radio channel 2064 from the other radio channel. The RRD control radio channel 2064 may particularly relate to a radio channel used for a short-range radio technology such as Bluetooth or WiFi.

Similarly, the second CN 202 may include control circuitry 272, memory circuitry 262, in particular non-volatile memory, 262, and interface circuitry 282. The interface circuitry 282 may be adapted for controlling transmission/reception of signals having a third polarization on a radio channel 2041 via a first antenna group 2821 comprising one or more antennas and signals having a fourth polarization on the radio channel 2042 via second antenna group 2822. The third polarization may be different from the fourth polarization. In particular, the third polarization may be orthogonal to the fourth polarization. In examples, the third polarization may be a horizontal polarization and the fourth polarization may be a vertical polarization. In other examples, the third polarization may be a right-handed circular polarization and the fourth polarization may be a left-handed circular polarization. It is also conceivable that the third polarization is a right-handed elliptical polarization and the fourth polarization is a left-handed elliptical polarization. The control circuitry 272 may be implemented by a processor 272. The processor 272 may be configured to load program code that is stored in the memory 262. The processor 272 may then execute the program code. Executing the program code may cause the processor to perform techniques as described herein. Due to its capability to transmit signals using a third and a fourth polarization, the second CN 202 may also be considered as dually polarized CN.

The RRD 203 may include control circuitry 273, memory circuitry 263, in particular non-volatile memory, 263, and interface circuitry 283. The interface circuitry 283 may be adapted for controlling accepting/transmitting of signals having a fifth polarization 1821, 1051 via a first antenna group 1831 comprising one or more antennas and signals having a sixth polarization 1042, 1812 on the radio channel via second antenna group 1832. The fifth polarization may be different from the sixth polarization. In particular, the fifth polarization may be orthogonal to the sixth polarization. The polarizations may be linear, circular or elliptical polarizations. The control circuitry 273 may be implemented by a processor 273. The processor 273 may be configured to load program code that is stored in the memory 263. The processor 273 may then execute the program code. Executing the program code may cause the processor to perform techniques as described herein. The RRD 203 may further comprise interface circuitry 293 for being controlled by the first CN 201 and/or the third CN 204 via signals 2061, 2064, respectively.

While the scenario of FIG. 2 illustrates the antenna groups 2811, 2812, 2821, 2822, 2841, 2842 being coupled to the first CN 101, the second CN 102 and the third CN 204, respectively, as a general rule, it would be possible to employ transmit-receive points (TRPs) that are spaced apart from the first CN 201, the second CN 202 and/or the third CN 204.

The interfaces 281, 282, 284 may each include one or more TX chains and one or more receiver chains. For instance, such RX chains can include low noise amplifiers, analogue to digital converters, mixers, etc. Analogue and/or digital beamforming would be possible. Thereby, phase-coherent transmitting and/or receiving (communicating) can be implemented across the multiple antenna groups 2811, 2812, 2821, 2822, 2841, 2842. Thereby, the first CN 201, the second CN 202 and the third CN 204 may selectively transmit on multiple TX beams (beamforming), to thereby direct energy into distinct spatial directions.

By using a TX beam, the direction of the wavefront of signals transmitted by a transmitter of the communication system is controlled. Energy is focused into a respective direction or even multiple directions, by phase-coherent superposition of the individual signals originating from each antenna group 2811, 2812, 2821, 2841, 2842. Thereby, the spatial data stream can be directed. The spatial data streams transmitted on multiple beams can be independent, resulting in spatial multiplexing multi-antenna transmission; or dependent on each other, e.g., redundant, resulting in diversity multi-input multi-output (MIMO) transmission. As a general rule, alternatively or additionally to such TX beams, it is possible to employ receive (RX) beams.

The RRD 203 may include a phased array of antennas that impose a configurable phase shift when reflecting incident signals. This defines respective spatial filters that are associated with spatial directions into which the incident signals are reflected. The antennas can be passive or semi-passive elements that do not provide any amplification. The RRD 203 thus provides coverage extension by reflection of radiofrequency (RF) signals. A translation to the baseband may not be required. This is different, to, e.g., decode-and-forward repeater or relay functionality. This is only one example implementation of the RRD. Other implementations are conceivable. For example, a meta-material surface not including distinct antenna elements may be used. The meta-material can have a configurable refraction index. To provide a re-configurable refraction index, the meta-material may be made of repetitive tunable structures, in particular as periodic tunable structures that have extensions smaller than the wavelength of the incident RF signals.

As illustrated in FIG. 2, there can be UL communication 2052, 2042 from the first CN 201 via the RRD 203 to the second CN 202, as well as UL communication 2051, 2041 from the third CN 204 via the RRD 203 to the second CN 202. The RRD 203 may transmit, in particular reflect, incident signals in an output spatial direction using an output polarization based on a property of the incident signals. The property of the incident signal may be a polarization. The property of the incident signal may also be an input spatial direction of the incident signal. The incident signals 2051, 2052 may be accepted, by the RRD 203 from different input spatial directions. The first CN 201 and second CN 202 may transmit the signals 2051, 2052 using the same. Optionally, the first CN 201 and the third CN 204 may use different polarizations for transmitting the signals 2051, 2052. The RRD 203 may transmit the signals 2041, 2042 in the same output spatial direction but with different polarizations based on the property (i.e., input spatial direction and/or input polarization) of the respective incident signal 2051, 2052.

Figure 3:
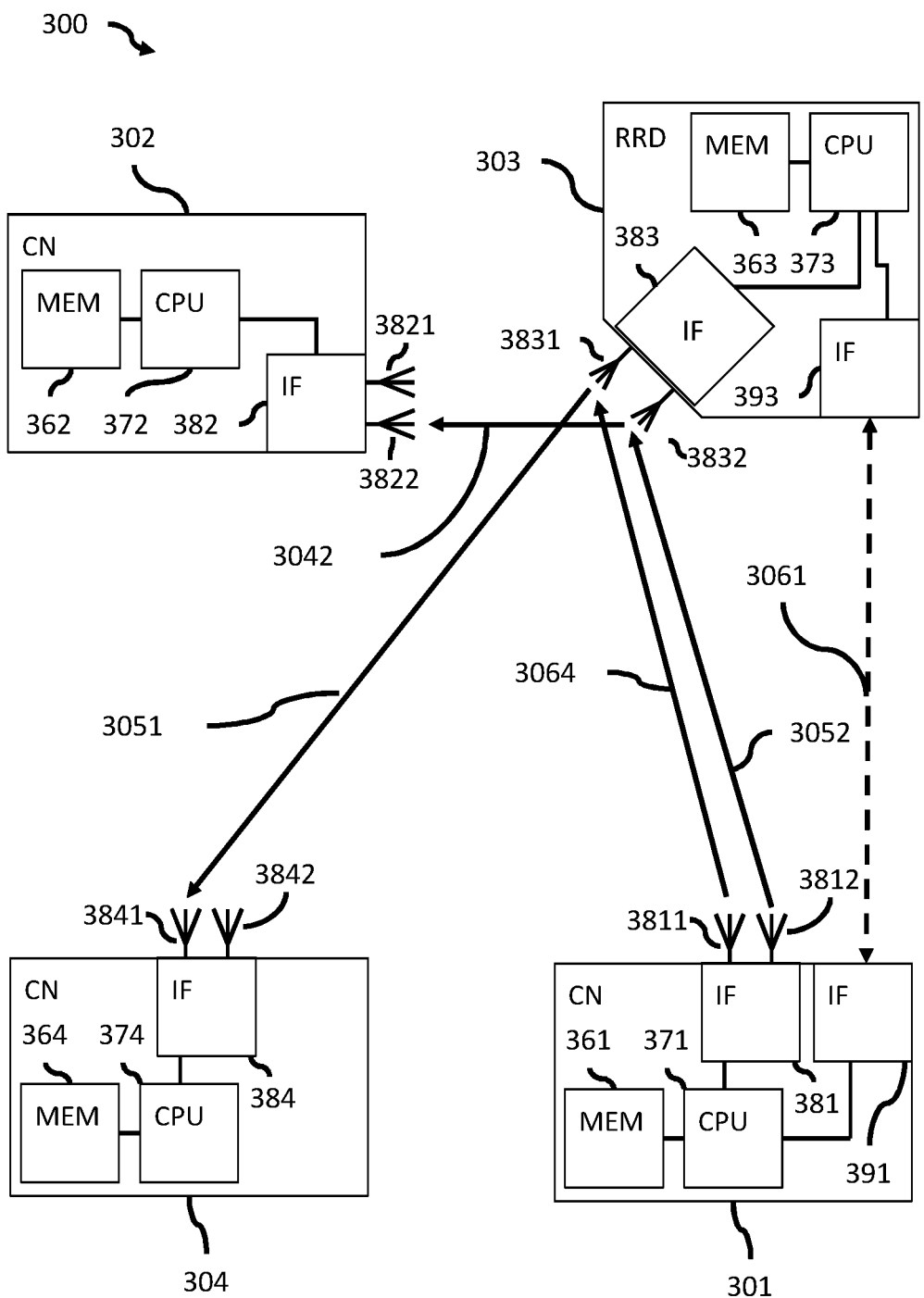
FIG. 3 schematically illustrates a communication system according to a third scenario.

FIG. 3 shows a scenario similar to the scenario of FIG. 1. Elements 300, 301, 302, 303, 304, 3061, 361, 362, 363, 364, 371, 372, 373, 374, 381, 382, 383, 384, 3811, 3812, 3821, 3822, 3831, 3832, 3841, 3842, 391, 393 respectively corresponds to elements 100, 101, 102, 103, 104, 1061, 161, 162, 163, 164, 171, 172, 173, 174, 181, 182, 183, 184, 1811, 1812, 1821, 1822, 1831, 1832, 1841, 1842, 191, 193 shown in and explained with respect to FIG. 1. The scenario of FIG. 3 differs from the scenario of FIG. 1 in that it is the CN controlling the RRD 303, namely, the first CN 301, which transmits two signals 3064, 3052 in the same direction but with different polarizations to the RRD 303 which transmits the corresponding signals 3051, 3042 using different output spatial directions.

Figure 4:
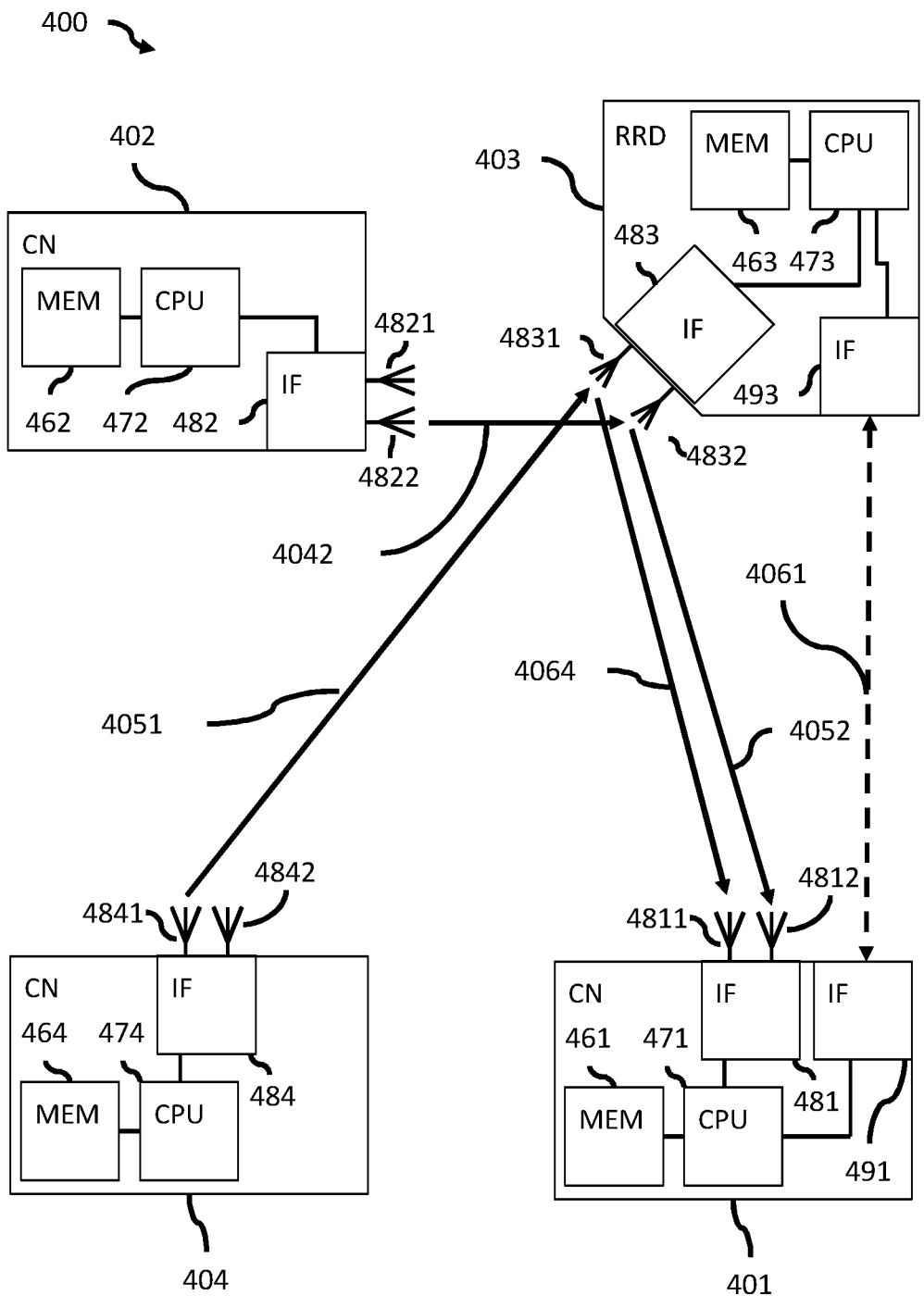
FIG. 4 schematically illustrates a communication system according to a fourth scenario.

FIG. 4 shows a scenario similar to the scenario of FIG. 2. Elements 400, 401, 402, 403, 404, 4061, 461, 462, 463, 464, 471, 472, 473, 474, 481, 482, 483, 484, 4811, 4812, 4821, 4822, 4831, 4832, 4841, 4842, 491, 493 correspond to element elements 20, 201, 202, 203, 204, 2061, 261, 262, 263, 264, 271, 272, 273, 274, 281, 282, 283, 284, 2811, 2812, 2821, 2822, 2831, 2832, 2841, 2842, 291, 293 shown in and explained with respect to FIG. 2. The scenario of FIG. 4 differs from the scenario of FIG. 2 in that it is the CN controlling the RRD 403, namely, the first CN 401, which receives two signals 4064, 4052 from the same direction but with different polarizations from the RRD 403, wherein the RRD 403 receives the corresponding signals 4051, 4042 as incident signals having different properties, namely, different input spatial directions and, optionally, different input polarizations.

Figure 5:
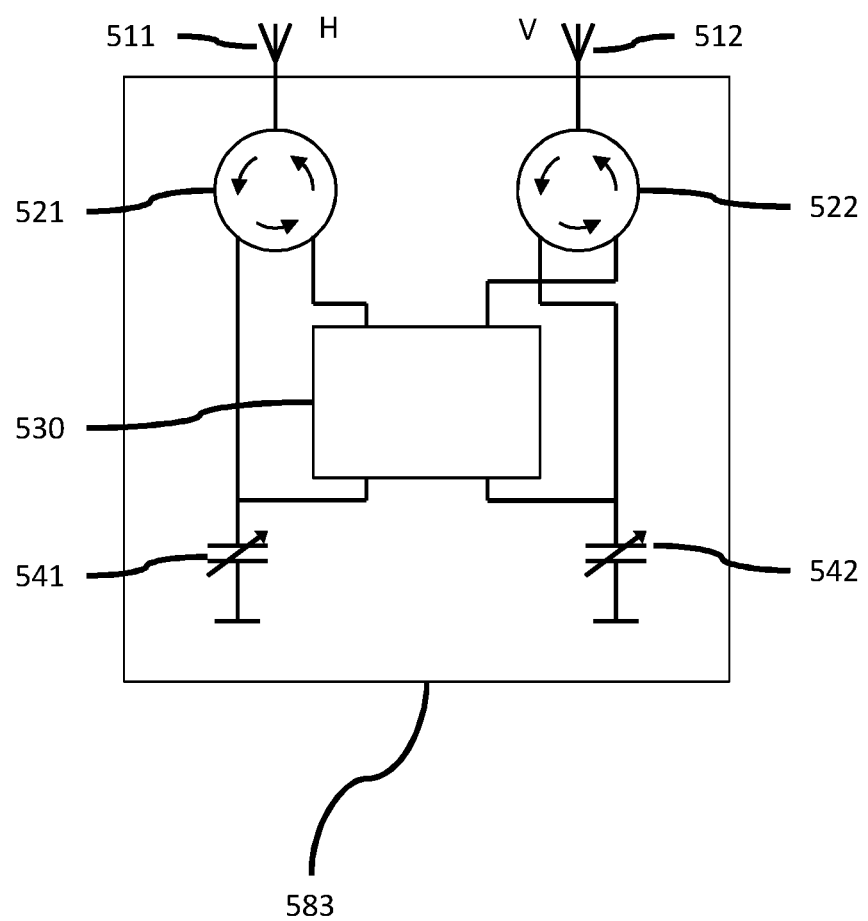
FIG. 5 schematically illustrates an exemplary element of a reconfigurable relaying device.

FIG. 5 illustrates circuitry 583 of an RRD which may be used in a scenario as explained hereinbefore. For simplifications purposes, FIG. 5 illustrates the circuitry for one dually polarized antenna element at the RRD with a first antenna 511 associated with a first polarization, e.g. a horizontal polarization, and a second antenna 512 associated with a second polarization, e.g. a vertical polarization.

Further, the circuitry 583 comprises circulators 521, 522 connected to the antennas 511, 512 and to phase shifters 541, 542, respectively. The phase shifters 541, 542, may be implemented as adjustable capacitors. Moreover, circulators 521, 522 are connected to outputs of a switch 530. The circuitry 583 may correspond to one of a plurality of reflective elements, in particular polarized reflective elements, of the RRD. Disjoints subsets of the reflective elements may be associated with multiple spatial polarization filterings. Orthogonally polarized reflective elements of the RRD may be associated with different subsets.

In an exemplary scenario, the second CN 102 (for example, a base station (BS) or gNB as specified by 3GPP) may transmit a signal and the RRD 103 may reflect the incoming signal towards the first CN 101 (for example, a wireless communication device or user equipment (UE)). For dually polarized CNs, polarization properties of the link from the second CN 102 to the RRD 103 can be mathematically modeled with a 2×2 complex valued matrix $H_1$, and the polarization properties of the link from the RRD 103 to the first CN 101 can be modeled with another 2×2 complex valued matrix $H_2$. The RRD 103 may be modelled by another 2×2 complex valued. The matrix Q may also be considered as spatial polarization filter. Accordingly, the mathematical model for the overall link from the second CN 102 to the first CN 101 then becomes $H_2QH_1$.

Typically, the matrices $H_1$ and $H_2$ are not directly observable but only the product $H_2QH_1$. As explained hereinbefore, the RRD 103 may provide spatial polarization filtering. Thus, predefined measurement spatial polarization filters may be applied by the RRD 103 to incident signals. Using predetermined reference signals in combination with predefined measurement spatial polarization filters may allow for estimating $H_1$ and $H_2$ by observing $H=H_2Q\ H_1$.

N measurements may be used for estimating $H_1$ and $H_2$. The second CN 102 may transmit N reference signals which may mathematically be represented by N 2×1 vectors $x_1$, $x_2$, ..., $x_N$ via the RRD 103 to the first CN 101. To these reference signals, the RRD 103 may apply respective predefined measurement spatial polarization filters which may be mathematically represented by N 2×2 polarization matrices $Q_1$, $Q_2$, ..., $Q_N$. Thus, as a basis for determining the optimal matrix Q, and in the absence of noise, the first CN 101 may have the following N signals at its disposal, $$y_n = H_2 Q_n H_1 x_n, \ 1 \leq n \leq N.$$

In an example, $H_1$ and $H_2$ may be estimated, up to a complex scalar $\beta$, using N=5 measurements. In particular, the following reference signals $$x_1 = \begin{bmatrix} 1 \\ 0 \end{bmatrix}, x_2 = \begin{bmatrix} 1 \\ 0 \end{bmatrix}, x_3 = \begin{bmatrix} 0 \\ 1 \end{bmatrix}, x_4 = \begin{bmatrix} 1 \\ 0 \end{bmatrix}, x_5 = \begin{bmatrix} 0 \\ 1 \end{bmatrix},$$

may be transmitted and the corresponding predefined measurement spatial polarization filters $$Q_1 = \begin{bmatrix} 1 & 0 \\ 0 & 0 \end{bmatrix}, Q_2 = \begin{bmatrix} 0 & 0 \\ 1 & 0 \end{bmatrix}, Q_3 = \begin{bmatrix} 1 & 0 \\ 0 & 0 \end{bmatrix}, Q_4 = \begin{bmatrix} 0 & 1 \\ 0 & 0 \end{bmatrix}, Q_5 = \begin{bmatrix} 0 & 1 \\ 0 & 0 \end{bmatrix}$$

may be applied.

Using the definitions $$H_1 = \begin{bmatrix} h_1 \\ h_2 \end{bmatrix}, h_1 = [h_{11} \ h_{12}], h_2 = [h_{21} \ h_{22}],$$

$$H_2 = [z_1 \ z_2], z_1 = \begin{bmatrix} z_{11} \\ z_{21} \end{bmatrix}, z_2 = \begin{bmatrix} z_{12} \\ z_{22} \end{bmatrix}.$$

the first CN 101 may measure $y_1 = z_1 h_{11} + n_1$ for estimating $\beta \ \widehat{z_1}$ with $\beta = h_{11}$;

$y_2 = z_2 h_{11} + n_2$ for estimating $\beta \ \widehat{z_2}$;

$y_3 = z_1 h_{12} + n_3$ for estimating $\beta^{-1} \ \widehat{h_{12}}$;

$y_4 = z_1 h_{21} + n_4$ for estimating $\beta^{-1} \ \widehat{h_{21}}$; and $y_5 = z_1 h_{22} + n_5$ for estimating $\beta^{-1} \ \widehat{h_{22}}$.

The terms n_n cited above indicate noise.

Thus, n=5 measurements may be sufficient for estimating $\beta \ \widehat{H_2}$ and $\beta^{-1} \ \widehat{H_1}$ with $\beta = h_{11}$. This may be an optimal solution since $H_2 Q H_1 = (\beta H_2) Q (\beta^{-1} H_1)$ for any complex scalar $\beta \neq 0$.

Knowing $H_1$ and/or $H_2$ may allow for adapting the polarization of a signal transmitted by a CN to the specific polarization which the RRD uses for determining to which CN the signal is to be reflected. In the following it may thus be assumed without losing generality that the polarizations between the CN and the RRD do not change.

The presence of a re-configurable relaying device equipped with certain capabilities, may simplify polarization multi-user MIMO and render it more feasible.

In scenarios where the RRD is controlled by the UEs, the AN needs information about the said capabilities so that it will consider polarization multi-user MIMO as an option.

As an example, case (i) may be described further. The received signals in absence of noise within the spatial beam towards the two dually-polarized UEs, a first UE (UE1) and a second UE (UE2), become $$\begin{bmatrix} y_{1,\uparrow} \\ y_{1,\rightarrow} \\ y_{2,\uparrow} \\ y_{2,\rightarrow} \end{bmatrix} = \begin{bmatrix} g_{1,\uparrow\uparrow} & g_{1,\uparrow\rightarrow} \\ g_{1,\rightarrow\uparrow} & g_{1,\rightarrow\rightarrow} \\ g_{2,\uparrow\uparrow} & g_{2,\uparrow\rightarrow} \\ g_{2,\rightarrow\uparrow} & g_{2,\rightarrow\rightarrow} \end{bmatrix} \begin{bmatrix} x_\uparrow \\ x_\rightarrow \end{bmatrix}$$

where $x_\uparrow$ and $x_\rightarrow$ are the AN signals in its two polarizations respectively, $g_{2,\uparrow\rightarrow}$ is the channel between the AN's horizontal polarization to UE2's vertical polarization (and similar for the other g variables), and e.g. $y_{1,\rightarrow}$ is UE1's horizontal polarization output. To make polarization multi-user MIMO work, the AN and the two UEs may have to be configured such that $$\begin{bmatrix} f_{1,\uparrow} & f_{1,\rightarrow} & 0 & 0 \\ 0 & 0 & f_{2,\uparrow} & f_{2,\rightarrow} \end{bmatrix} \begin{bmatrix} g_{1,\uparrow\uparrow} & g_{1,\uparrow\rightarrow} \\ g_{1,\rightarrow\uparrow} & g_{1,\rightarrow\rightarrow} \\ g_{2,\uparrow\uparrow} & g_{2,\uparrow\rightarrow} \\ g_{2,\rightarrow\uparrow} & g_{2,\rightarrow\rightarrow} \end{bmatrix} \begin{bmatrix} p_{11} & p_{12} \\ p_{21} & p_{22} \end{bmatrix}$$

is a diagonal matrix.

In the above equation, the matrix formed by the p variables corresponds to the beamforming at the AN, while the matrix formed by the f variables corresponds to the beamforming at the UEs. As the channel matrix (g variables) is time-variant, the AN must continuously adapt its configuration p variables. As such adaptation may require significant overhead in order to maintain a high-quality estimate of the channel matrix, a resource scheduler may choose to separate the two UEs in time and/or frequency rather than using polarization alignments.

Techniques are proposed in this disclosure to allow an AN to benefit from polarization aspects to serve UEs in a scenario of case (ii). Further, techniques are provided rendering AN polarization suitable as a more viable option for a resource scheduler.

Hereinafter, the following considerations focus on the transmissions from the AN to the RRD, and then from the RRD to the UEs. Corresponding considerations may apply to the reverse direction. Moreover, it is assumed that the RRD is capable of tracking the spatial beam directions to the two UEs.

The RRD may form one spatial receive beam direction towards the AN and is assumed to be dually polarized. Dually polarized may refer to the RRD being able to transmit signals to the AN using two distinct polarizations, e.g., horizontal and vertical polarizations. Mathematically, within the said beam direction the RRD may receive the signal $$z = \begin{bmatrix} z_\uparrow \\ z_\rightarrow \end{bmatrix} = \begin{bmatrix} h_{\uparrow\uparrow} & h_{\uparrow\rightarrow} \\ h_{\rightarrow\uparrow} & h_{\rightarrow\rightarrow} \end{bmatrix} \begin{bmatrix} x_\uparrow \\ x_\rightarrow \end{bmatrix}.$$

The RRD may now reflect the signal z using two different spatial beams, one to each UE. The RRD may choose to reflect $z_\uparrow$ to UE1 and $z_\rightarrow$ to UE2, or $z_\uparrow$ to UE2 and $z_\rightarrow$ to UE1. In the former case, the received signals at the two UEs read:

$$\begin{bmatrix} y_{1,\uparrow} \\ y_{1,\rightarrow} \\ y_{2,\uparrow} \\ y_{2,\rightarrow} \end{bmatrix} = \begin{bmatrix} t_{1,\uparrow\uparrow} & 0 \\ t_{1,\rightarrow\uparrow} & 0 \\ 0 & t_{2,\uparrow\rightarrow} \\ 0 & t_{2,\uparrow\rightarrow} \end{bmatrix} \begin{bmatrix} h_{\uparrow\uparrow} & h_{\uparrow\rightarrow} \\ h_{\rightarrow\uparrow} & h_{\rightarrow\rightarrow} \end{bmatrix} \begin{bmatrix} x_{\uparrow} \\ x_{\rightarrow} \end{bmatrix}$$

wherein $z_{\uparrow}$ is reflected to UE1 and $z_{\rightarrow}$ to UE2.

In the latter case the signals would read:

$$\begin{bmatrix} y_{1,\uparrow} \\ y_{1,\rightarrow} \\ y_{2,\uparrow} \\ y_{2,\rightarrow} \end{bmatrix} = \begin{bmatrix} 0 & t_{1,\uparrow\rightarrow} \\ 0 & t_{1,\rightarrow\rightarrow} \\ t_{2,\uparrow\uparrow} & 0 \\ t_{2,\rightarrow\uparrow} & 0 \end{bmatrix} \begin{bmatrix} h_{\uparrow\uparrow} & h_{\uparrow\rightarrow} \\ h_{\rightarrow\uparrow} & h_{\rightarrow\rightarrow} \end{bmatrix} \begin{bmatrix} x_{\uparrow} \\ x_{\rightarrow} \end{bmatrix}$$

wherein $z_{\uparrow}$ reflected to UE2 and $z_{\rightarrow}$ to UE1.

Due to the structure of the signal models, described above, inter-user interference is eliminated if the signal $x=[x_{\uparrow}\ x_{\rightarrow}]^T$ is constructed from the data symbols $a_1$ and $a_2$ (to UE1 and UE2, respectively) as:

$$\begin{bmatrix} x_{\uparrow} \\ x_{\rightarrow} \end{bmatrix} = \begin{bmatrix} p_{11} & p_{12} \\ p_{21} & p_{22} \end{bmatrix} \begin{bmatrix} a_1 \\ a_2 \end{bmatrix} \text{ with}$$

$$\begin{bmatrix} h_{\uparrow\uparrow} & h_{\uparrow\rightarrow} \\ h_{\rightarrow\uparrow} & h_{\rightarrow\rightarrow} \end{bmatrix} \begin{bmatrix} p_{11} & p_{12} \\ p_{21} & p_{22} \end{bmatrix} = \begin{bmatrix} 1 & 0 \\ 0 & 1 \end{bmatrix},$$

if $z_{\uparrow}$ is reflected to UE1 and $z_{\rightarrow}$ to UE2, and with $$\begin{bmatrix} h_{\uparrow\uparrow} & h_{\uparrow\rightarrow} \\ h_{\rightarrow\uparrow} & h_{\rightarrow\rightarrow} \end{bmatrix} \begin{bmatrix} p_{11} & p_{12} \\ P_{21} & P_{22} \end{bmatrix} = \begin{bmatrix} 0 & 1 \\ 1 & 0 \end{bmatrix},$$

if $z_{\uparrow}$ is reflected to UE2 and $z_{\rightarrow}$ to UE1.

This may be the same mathematically problem as explained with respect to case (i) above for UEs using fixed f variables.

Typically, the AN and the RRD do not move or rotate with respect to each other. Thus, the channel (h variables) between the AN and the RRD may be considered virtually static. Therefore, the beamformer may be formed once and kept static for an extended period of time. This may facilitate transmission using polarization multi-user MIMO to two UEs that are physically separated as explained with respect to case (ii) above.

For broadcast signals, $a_B$, e.g. SSBs (synchronization signal block), the AN may rotate the polarization 45 degrees. This is effectively obtained by setting the data symbols $a_1$ and $a_2$ (to UE1 and UE2, respectively) to the same value $a_B$, i.e. $a_1=a_2=a_B$. Setting $a_1=a_2=a_B$ may also be used if $a_1$ and $a_2$ relate to orthogonal circular polarizations. In such a case, the resulting signal has a linear polarization.

Implementing the techniques may require signaling between different communications network. For example, for an AN to execute the operations described in the previous subsection, it may be necessary for the AN to be aware that it is communicating with the two physically separated UEs via an RRD which takes care of the spatial separation. The UEs may control the RRD, so the AN may be a-priori unaware of its presence. An example scenario could be a gaming scenario where two players are located in the same room as an RRD. For such scenario, it is reasonable to assume that the AN operator is unaware of the RRD.

Figure 6:
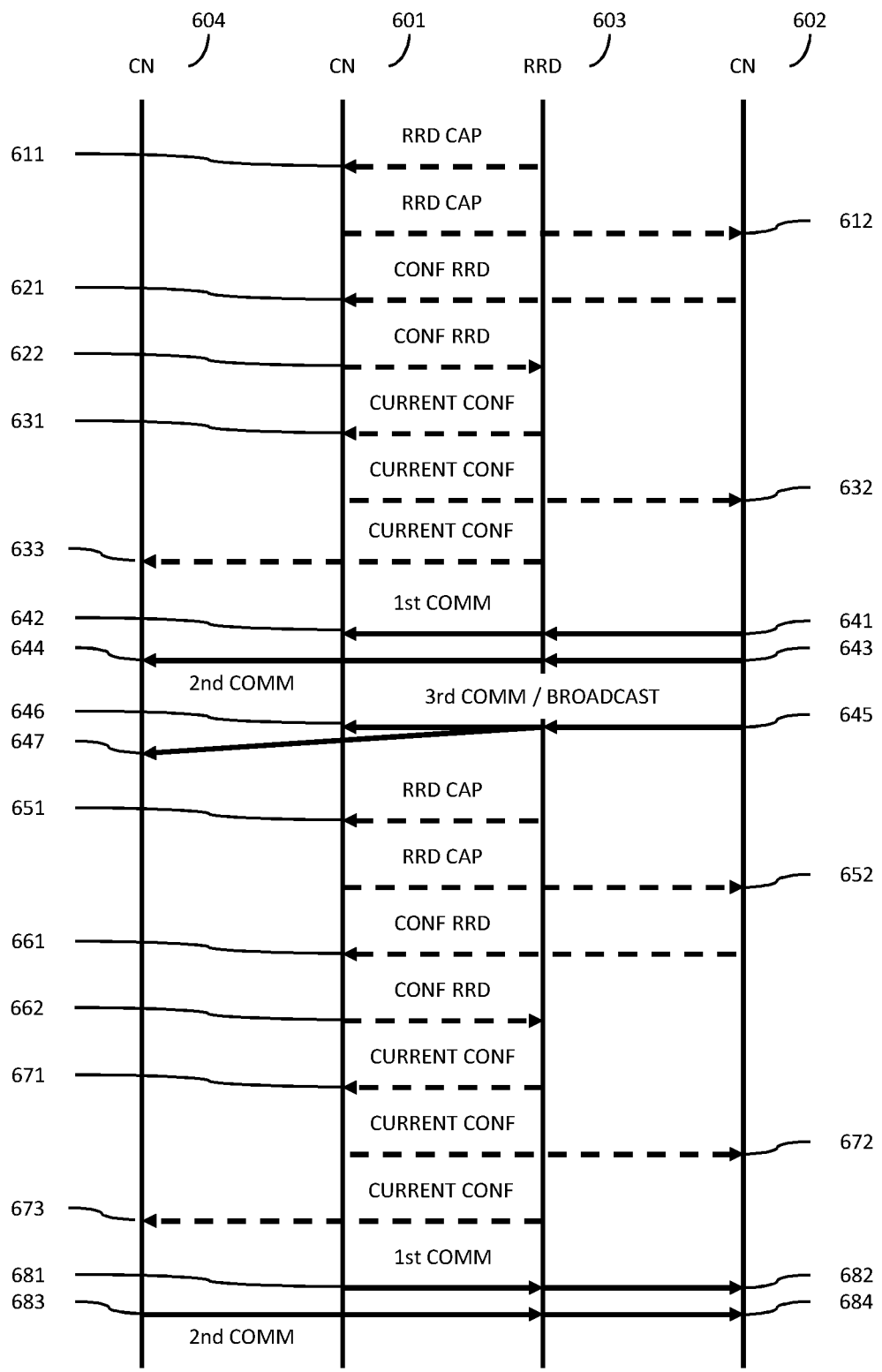
FIG. 6 illustrates signalling in a communication system.

FIG. 6 illustrates signaling between a first CN 601, a second CN 602, a third CN 604 and an RRD 603 corresponding to the scenarios explained with respect to FIG. 1 and FIG. 2.

The re-configurable relaying device (RRD) 603 may be a re-configurable reflective device. The RRD 603 may be reconfigurable to provide multiple contemporaneous spatial polarization filterings, each one of the multiple spatial polarization filterings being associated with a respective input spatial direction from which incident signals on a radio channel are accepted and with a respective output spatial direction into which the incident signals are transmitted, in particular reflected, by the RRD 603.

Signals indicated with dashed lines may but not necessarily are transmitted via the RRD 603. In particular, different radio channels, for example radio channels associated with a short-range radio technology such as Bluetooth or WiFi may be used.

Although, messages are described as being provided/obtained individually in the following, it is also conceivable that one message comprises the information associated with several of these individual messages.

The RRD 603 may provide, to the first CN 601, a message 611 indicative of the RRD 603 being configurable to transmit an incident signal from a second CN 602 using an output spatial direction to the first CN 601 depending on property of the incident signal.

The first CN 601 may provide, to the second CN 602, a message 612 indicative of the RRD 603 being configurable to transmit an incident signal from the second CN 602 using an output spatial direction to the first CN 601 depending on a property of the incident signal. In particular, the message 612 may indicate that the RRD 603 is a configurable dually polarized RRD. Thus, the second CN 602 may use said property of the RRD 603 for transmitting signals selectively to the first CN 601 and a further CN. This may allow for a more efficient use of the link from the second 602 to the RRD.

From the second CN 602, the first CN 601 may obtain a message 621 for configuring the RRD 603 to transmit an incident signal using the output spatial direction to the first CN 601 depending on the property of the incident signal. Thus, the message 621 may indicate that polarization separation may be used.

The first CN 601 may provide, to the RRD 603, a message 622 for configuring the RRD 603 to transmit an incident signal using the output spatial direction to the first CN 601 depending on the property of the incident signal. Thus, the first CN 601 may configure the RRD 603 for polarization separation to take place.

Alternatively, or in addition, the first CN 601 may obtain, from the RRD 603, a message 631 indicative of the RRD 603 being configured to transmit an incident signal using an output spatial direction to the first CN 601 depending on the property of the incident signal. Hence, the first CN 601 may be informed about the actual configuration of the RRD.

The first CN 601 may optionally provide, to the second CN 602, a message 632 indicative of the RRD 603 being configured to transmit an incident signal using an output spatial direction to the first CN 601 depending on the property of the incident signal. Thus, the first CN 601 may forward the information on the current configuration of the RRD 603 to the second CN 602, which may use this information for adapting the polarization of communication signals intended for the first CN 601.

The second CN 602 may transmit, on the radio channel, a first communication signal 641 using a first polarization corresponding to the property of the incident signal for the incident signal accepted by the RRD 603 to be transmitted, by the RRD 603, using the output spatial direction to the first CN 601. Thus, the second CN 602 may use a dedicated first polarization, e.g., a horizontal polarization, to transmit the first communication signal 641 to the first CN 601. In particular, the RRD 603 may be configured to transmit incident signals with the first polarization in a static or semi-static way to the first CN 601.

In addition, the second CN 602 may transmit, on the radio channel, a second communication signal 643 using a second polarization corresponding to the property of the incident signal for the incident signal accepted by the RRD 603 to be transmitted, by the RRD 603, using an output spatial direction to the third CN 604. Accordingly, the second CN 602 may use a dedicated second polarization, e.g., a vertical polarization, to transmit the second communication signal 643 to the third CN 604. In particular, the RRD 603 may be configured to transmit incident signals with the second polarization in a static or semi-static way to the third CN 604. Thus, the second CN 602 may use the first polarization and/or the second polarization to specifically transmit first and second communication signals to the first CN 601 and the third CN 604, respectively. The second CN 602 may transmit the first and second communication signals in the same time/frequency domain. Due to the different polarizations, these communication signals may still be directed to different CNs. This may allow for a more efficient usage of the available physical resources.

After reflection, by the RRD 603, the first CN 601 may receive the signal 641 as signal 642 and the third CN 604 may receive the signal 643 as signal 644. In particular, the polarizations after reflection, by the RRD 603, may be different from the polarization used by the RRD 603 for distinguishing the incident first communication signal and second communication signal respectively.

Alternatively, or in addition, the second CN 602 may transmit, on the radio channel, a third communication signal 645 using a third polarization. The third communication signal 645 may be intended to be received by both the first CN 601 and the third CN 604. For example, the third polarization may be a linear combination of the first polarization and the second polarization (e.g., a 45°-polarization in case of vertical and horizontal polarizations or a linear polarization in case of left/right circular polarizations). Thus, the third polarization may correspond to the property of the incident signal (e.g., the incident signal comprises a horizontal polarization) for the incident signal accepted by the RRD 603 to be transmitted, by the RRD 603, using an output spatial direction to the third CN. At the same time, the third polarization may correspond to the property of the incident signal (e.g., the incident signal also comprises a vertical polarization) for the incident signal accepted by the RRD 603 to be transmitted, by the RRD 603, using an output spatial direction to the third CN 604. The proportion of first polarization and second polarization included in the third polarization may determine the amount of energy of the third communication signal 645 transmitted to the first CN 601 and the third CN 604, respectively.

After reflection, by the RRD 603, the first CN 601 and the third CN 604 may receive the same signal 645 as signal 646, 647 respectively. The third communication signal 645 may be a broadcast communication signal. Thus, the first CN 601 may use the third communication signal 645 to provide the first CN 601 and the third CN 604 with the same information.

The first CN 601 may receive, from the RRD 603, a message 651 indicative of the RRD 603 being configurable to transmit an incident signal from the first CN 601 in an output spatial direction to the second CN 602 with an output polarization depending on a property of the incident signal.

The first CN 601 may provide, to a second CN 602, a message 652 indicative of the RRD 603 being configurable to transmit an incident signal from the first CN 601 in an output spatial direction to the second CN 602 with an output polarization depending on a property of the incident signal. Thus, the second CN 602 may be made aware that the polarization of signals received by the second CN 602 may provide an information on the origin of the signals.

The second CN 602 may provide, to the first CN 601, a message 661 for configuring the RRD 603 to transmit an incident signal from the first CN 601 to the second CN 602 with an output polarization depending on the property of the incident signal. The RRD 603 may obtain, from the first CN 601, a message 662 for configuring the RRD 603 to transmit an incident signal using an output polarization depending on a property of the incident signal being indicative of the incident signal originating from the first CN 601. Hence, the configuration of the RRD 603, i.e., which output polarization is to be used for signals from which CN may be set by the first CN 601.

The RRD 603 may provide, to the first CN 601 a message 671 indicative of the RRD 603 being configured to transmit an incident signal from the first CN 601 in an output spatial direction to a second CN 602 with an output polarization depending on a property of the incident signal. Thus, the RRD 603 may inform the first CN 601 about its current configuration. The first CN 601 may provide, to the second CN 602, a message 672 indicative of the output polarization used for transmitting, by the RRD 603, an incident signal from the first CN 601, to the second CN 602. In examples, it may be the RRD 603 which determines which output polarization is to be used for signals from which CN. The messages 671 and 672 may allow for providing the information to the CNs which may adapt their transmission strategy accordingly.

The RRD 603 may further provide, to the third CN 604 a message 673 indicative of the RRD 603 being configured to transmit an incident signal from the third CN 604 in an output spatial direction to the second CN 602 with an output polarization depending on a property of the incident signal.

The second CN 602 may receive, on the radio channel, a first communication signal 682 having a first polarization corresponding to an output polarization of an incident signal, transmitted by the RRD, originating from the first CN 601 and a second communication signal 684 having a second polarization corresponding to an output polarization of an incident signal, transmitted by the RRD 603, originating from the third CN 604, wherein the first polarization and the second polarization are different, in particular orthogonal. The first communication signal 682 may correspond to a first communication signal 681 transmitted by the first CN 601, wherein the first communication signal 681 has a property which induces a transmission of said signal as first communication signal 682 with a specific output polarization by the RRD 603. Likewise, the second communication signal 684 may correspond to a second communication signal 683 transmitted by the third CN 604, wherein the second communication signal 683 has a property which induces a transmission of said signal as second communication signal 684 with another specific output polarization by the RRD 603.

Figure 7:
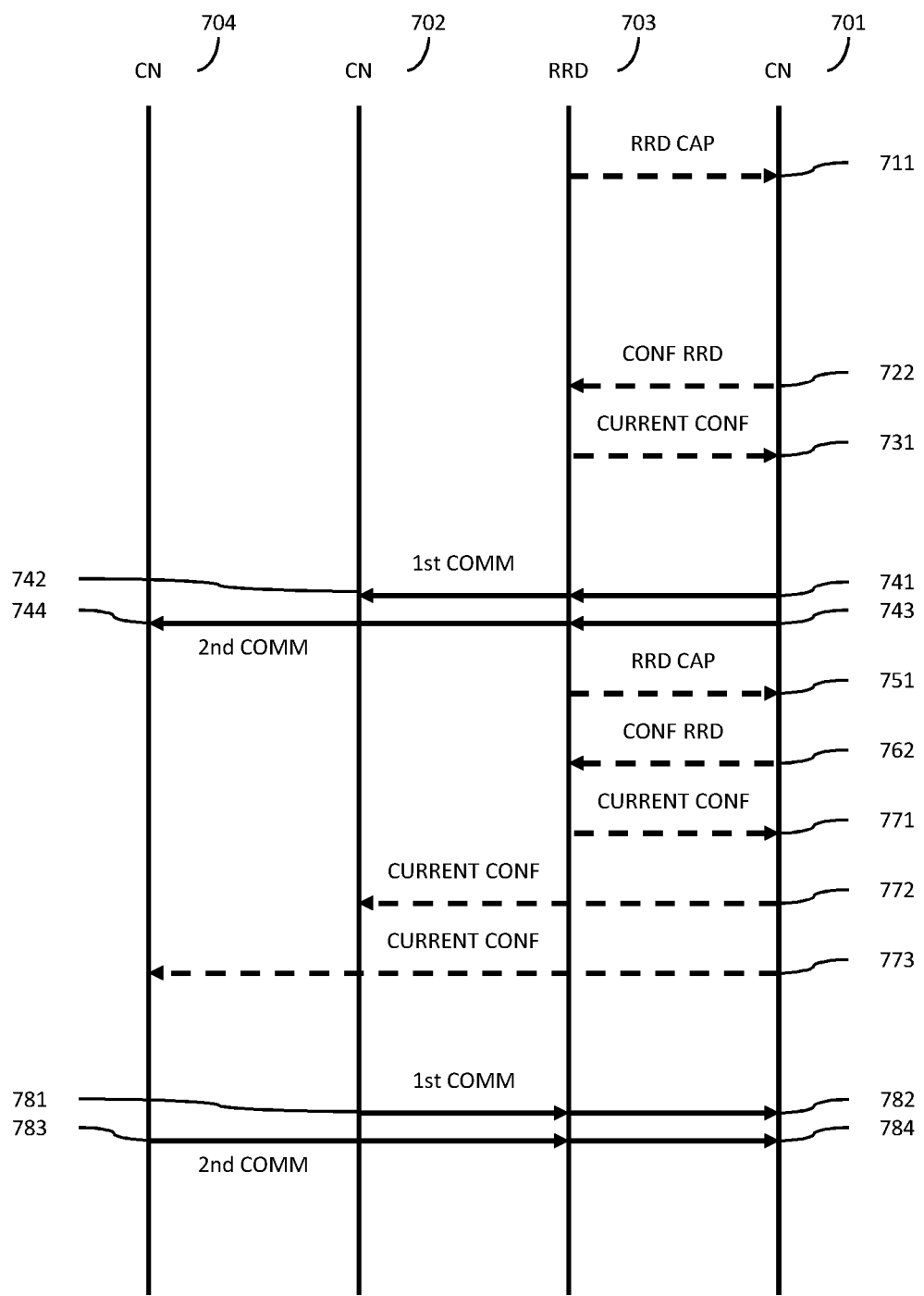
FIG. 7 illustrates signalling in a communication system.

FIG. 7 shows a further signalling diagram relating to the scenarios of FIG. 3 and FIG. 4 and illustrating the signals exchanged between a first CN 701, a second CN 702, a third CN 704 and an RRD 703. The signals 711, 722, 731, 741, 742, 743, 744, 751, 762, 771, 772, 773, 781, 782, 784 correspond to the signals 611, 622, 631, 641, 642, 643, 644, 651, 662, 671, 672, 673, 681, 682, 684. Thus, reference is made to the corresponding explanations above. In contrast to the scenario of FIG. 6, the scenario FIG. 7 relates to a situation in which the node controlling the RRD 703, i.e. the first CN 701 transmits and/or receives both the first communication signals 741, 782 and the second communication signals 743, 784.

Figure 8:
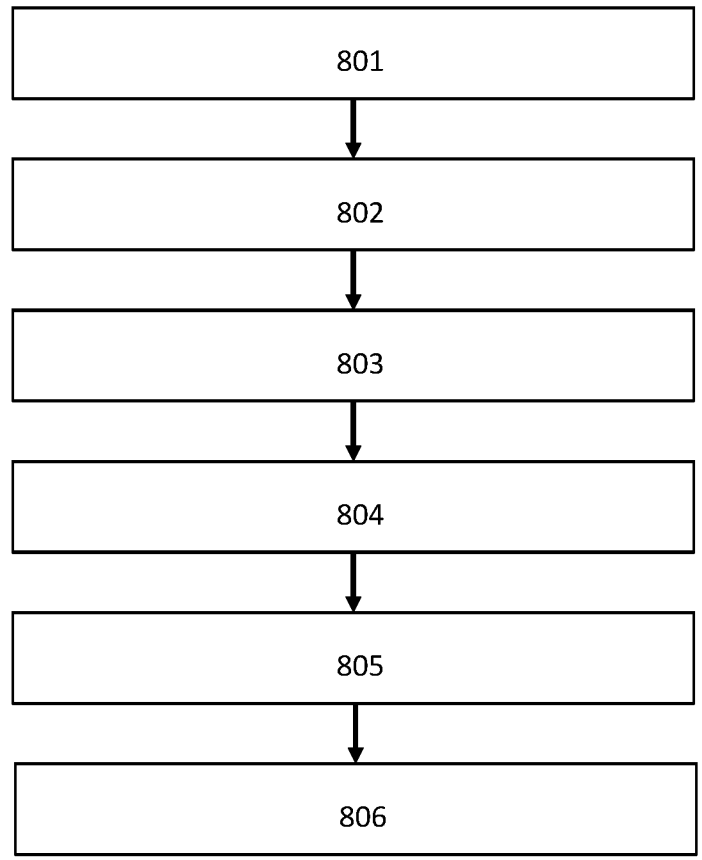
FIG. 8 illustrates an operation of a first CN.

FIG. 8 briefly illustrates an operation of a first CN. In step 801, the first CN may provide a message indicative of an RRD being configurable to transmit an incident signal from a second CN using an output spatial direction to the first CN depending on a property of the incident signal. In step 802, the first CN may obtain a message for configuring the RRD to transmit an incident signal using an output spatial direction to the first CN depending on the property of the incident signal. In step 803, the first CN may provide a message for configuring the RRD to transmit an incident signal using an output spatial direction to the first CN depending on the property of the incident signal. In step 804, the first CN may obtain a message indicative of the RRD being configured to transmit an incident signal using an output spatial direction to the first CN depending on the property of the incident signal. In step 805, the first CN may provide a message indicative of a property of an incident signal for the incident signal to be transmitted, by the RRD, in the output spatial direction to the first CN. In step 806, the first CN may provide a message indicative of the RRD being configured for selectively transmitting an incident signal using an output spatial direction to the first CN or an output spatial direction to a third CN depending on the property of the incident signal.

Figure 9:
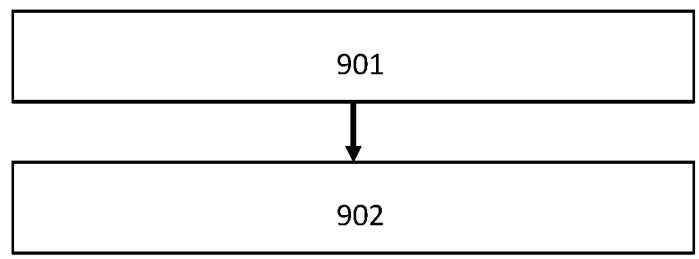
FIG. 9 illustrates an operation of a second CN.

FIG. 9 briefly illustrates an operation of a second CN. In step 901, the second CN may obtain a message indicative of the RRD being configurable to transmit an incident signal from the second CN using an output spatial direction to the first CN depending on a property of the incident signal. In step 902, the second CN may transmit, on a radio channel, a first communication signal using a first polarization corresponding to the property of the incident signal for the incident signal accepted by the RRD to be transmitted, by the RRD, using an output spatial direction to the first CN.

Although the disclosure has been shown and described with respect to certain preferred examples, equivalents and modifications will occur to others skilled in the art upon the reading and understanding of the specification. The present disclosure includes all such equivalents and modifications and is limited only by the scope of the appended claims.

For illustration, while various scenarios have been illustrated in the context of a DL transmission from a second CN 102 to a first CN 101 using the RRD 103, similar techniques can be applied for, e.g., transmissions between two mobile devices, e.g., to UEs on a sidelink or generally using device-to-device (D2D) communication. For further illustration, well above various scenarios have been described with an implementation of the RRD using an antenna array, similar techniques may be readily applied to other kinds and types of surfaces having a re-configurable refractive index.

Summarizing, at least the following examples have been described above:

Example 1

A method of operating a first communication node, CN, (601),
wherein the first CN (601) is configured for controlling a re-configurable relaying device, RRD, (603), in particular a re-configurable reflective device, the RRD (603) being reconfigurable to provide multiple contemporaneous spatial polarization filterings, each one of the multiple spatial polarization filterings being associated with a respective input spatial direction from which incident signals on a radio channel are accepted and with a respective output spatial direction into which the incident signals are transmitted, in particular reflected, by the RRD (603), the method comprising
providing, to a second CN (602), a message (612) indicative of the RRD (603) being configurable to transmit an incident signal from a second CN (602) using an output spatial direction to the first CN (601) depending on a property of the incident signal.

Example 2

The method of operating the first CN (601) of EXAMPLE 1,
wherein the property of the incident signal comprises a polarization of the incident signal, and/or
wherein the property of the incident signal comprises an input spatial direction of the incident signal.

Example 3

The method of operating the first CN (601) of EXAMPLE 1 or 2,
wherein the RRD (603) comprises a plurality of reflective elements, in particular polarized reflective elements.

Example 4

The method of operating the first CN (601) of EXAMPLE 3,
wherein disjoint subsets of the reflective elements of the RRD (603) are associated with the multiple spatial polarization filterings.

Example 5

The method of operating the first CN (601) of EXAMPLE 4,
wherein orthogonally polarized reflective elements of the RRD (603) are associated with different subsets.

Example 6

The method of operating the first CN (601) of any one of EXAMPLEs 1 to 5, the method further comprising
obtaining, from the second CN (602), a message (621) for configuring the RRD (603) to transmit an incident signal using the output spatial direction to the first CN (601) depending on the property of the incident signal.

Example 7

The method of operating the first CN (601) of any one of EXAMPLEs 1 to 6, the method further comprising
providing, to the RRD (603), a message (622) for configuring the RRD (603) to transmit an incident signal using the output spatial direction to the first CN depending on the property of the incident signal.

Example 8

The method of operating the first CN (601) of any one of EXAMPLEs 1 to 7, the method further comprising providing, to the second CN (602), a message (632) indicative of a property of an incident signal for the incident signal to be transmitted, by the RRD (603), in the output spatial direction to the first CN (601).

Example 9

The method of operating the first CN (601) of any one of EXAMPLEs 1 to 8, the method further comprising providing, to the second CN (102), a message (632) indicative of the RRD (603) being configured for selectively transmitting an incident signal using an output spatial direction to the first CN (601) or an output spatial direction to a third CN (604) depending on the property of the incident signal.

Example 10

The method of operating the first CN (601) of any one of EXAMPLEs 1 to 9, the method further comprising obtaining, from the RRD (603), a message (631) indicative of the RRD (603) being configured to transmit an incident signal using an output spatial direction to the first CN (601) depending on the property of the incident signal.

Example 11

A method of operating a second communication node, CN, (602), wherein the second CN (602) is configured to communicate with a first CN (601) via a re-configurable relaying device, RRD, (603), in particular a re-configurable reflective device, the RRD (603) being reconfigurable to provide multiple contemporaneous spatial polarization filterings, each one of the multiple spatial polarization filterings being associated with a respective input spatial direction from which incident signals on a radio channel are accepted and with a respective output spatial direction into which the incident signals are transmitted, in particular reflected, by the RRD (603), the method comprising obtaining, from the first CN (101), a message (612) indicative of the RRD (103) being configurable to transmit an incident signal from the second CN (102) using an output spatial direction to the first CN (102) depending on a property of the incident signal.

Example 12

The method of operating the second CN (602) of EXAMPLE 11, wherein the property of the incident signal comprises a polarization of the incident signal, and/or wherein the property of the incident signal comprises an input spatial direction of the incident signal.

Example 13

The method of operating the second CN (602) of EXAMPLE 11 or 12, wherein the RRD (603) comprises a plurality of reflective elements, in particular polarized reflective elements.

Example 14

The method of operating the second CN (602) of EXAMPLE 13, wherein disjoint subsets of the reflective elements of the RRD (603) are associated with the multiple spatial polarization filterings.

Example 15

The method of operating the second CN (602) of EXAMPLE 14, wherein orthogonally polarized reflective elements of the RRD (603) are associated with different subsets.

Example 16

The method of operating the second (602) of any one of EXAMPLEs 11 to 15, the method further comprising providing, to the first CN (602), a message (621) for configuring the RRD (603) to transmit an incident signal using an output spatial direction to the first CN (601) depending on the property of the incident signal.

Example 17

The method of operating the second CN (602) of any one of EXAMPLEs 11 to 16, the method further comprising obtaining, from the first CN (601), a message (632) indicative of a property of an incident signal for the incident signal to be transmitted, by the RRD (603), in the output spatial direction to the first CN (601).

Example 18

The method of operating the second CN (602) of any one of EXAMPLEs 11 to 17, the method further comprising obtaining, from the first CN (601), a message (632) indicative of the RRD selectively transmitting an incident signal using an output spatial direction to the first CN and an output spatial direction to a third CN depending on a property of the incident signal.

Example 19

The method of operating the second CN (602) of any one of EXAMPLEs 11 to 18, the method further comprising transmitting, on the radio channel, a first communication signal (641) using a first polarization corresponding to the property of the incident signal for the incident signal accepted by the RRD (603) to be transmitted, by the RRD (603), using the output spatial direction to the first CN (601).

Example 20

The method of operating the second CN (602) of EXAMPLE 19, the method further comprising transmitting, on the radio channel, a second communication signal (643) using a second polarization corresponding to the property of the incident signal for the incident signal accepted by the RRD (603) to be transmitted, by the RRD (603), using an output spatial direction to a third CN.

Example 21

The method of operating the second CN (602) of EXAMPLE 20,
wherein the first polarization and the second polarization are different, in particular orthogonal.

Example 22

The method of operating the second CN (602) of EXAMPLE 19, the method further comprising
transmitting, on the radio channel, a third communication signal (645) using a third polarization,
wherein the first polarization and the third polarization are different and non-orthogonal.

Example 23

The method of operating the second CN (602) of Example 22 and 19 and 20,
wherein the first polarization, the second polarization and the third polarization are linear polarizations and the third polarization lies between the first polarization and the second polarization.

Example 24

The method of operating the second CN (602) of EXAMPLE 23,
wherein the first polarization and the second polarization are essentially orthogonal and an angle between third polarization and the first polarization is essentially 45°.

Example 25

The method of operating the second CN (602) of EXAMPLE 22 and 19 and 20,
wherein the first polarization and the second polarization are circular polarizations and the third polarization is a linear polarization.

Example 26

A method of operating a re-configurable relaying device, RRD, (603), in particular a re-configurable reflective device, the RRD (603) being reconfigurable to provide multiple contemporaneous spatial polarization filtering, each one of the multiple spatial polarization filterings being associated with a respective input spatial direction from which incident signals on a radio channel are accepted and with a respective output spatial direction into which the incident signals are transmitted, in particular reflected, by the RRD (603), the method comprising
providing, to a first CN (601), a message (611) indicative of the RRD (603) being configurable to transmit an incident signal from a second CN (602) using an output spatial direction to the first CN (601) depending on the input polarization of the incident signal.

Example 27

The method of operating the RRD (603) of EXAMPLE 26,
wherein the property of the incident signal comprises a polarization of the incident signal, and/or
wherein the property of the incident signal comprises an input spatial direction of the incident signal.

Example 28

The method of operating the RRD (603) of EXAMPLE 26 or 27,
wherein the RRD (603) comprises a plurality of reflective elements, in particular polarized reflective elements.

Example 29

The method of operating the RRD (603) of EXAMPLE 28,
wherein disjoint subsets of the reflective elements of the RRD (603) are associated with the multiple spatial polarization filterings.

Example 30

The method of operating the RRD (603) of EXAMPLE 29,
wherein orthogonally polarized reflective elements of the RRD (603) are associated with different subsets.

Example 31

The method of operating the RRD (603) of any one of EXAMPLEs 26 to 30,
configuring the RRD (603) to transmit an incident signal using an output spatial direction to the first CN (601) depending on the property of the incident signal in response to at least one of
obtaining, from the first CN (601), a message (622) for configuring the RRD to transmit an incident signal using an output spatial direction to the first CN (601) depending on the property of the incident signal, and
observing, by the RRD (603), that the RRD (603) is to transmit incident signals to the first CN (601) and a third CN (603).

Example 32

The method of operating the RRD (603) of any one of EXAMPLEs 26 to 31, the method further comprising
selectively transmitting, on the radio channel, an incident signal using an output spatial direction to the first CN (601) and/or an output spatial direction to a third CN (604) depending on the property, in particular the input polarization, of the incident signal.

Example 33

A method of operating a first communication node, CN, (601),
wherein the first CN (601) is configured for controlling a re-configurable relaying device, RRD, (603), in particular a re-configurable reflective device, the RRD (603) being reconfigurable to provide multiple contemporaneous spatial polarization filterings, each one of the multiple spatial polarization filterings being associated with a respective input spatial direction from which incident signals on a radio channel are accepted and with a respective output spatial direction into which the incident signals are transmitted, in particular reflected, by the RRD (603), the method comprising providing, to a second CN (602), a message (652) indicative of the RRD (603) being configurable to transmit an incident signal from the first CN (601) in an output spatial direction to the second CN (602) with an output polarization depending on a property of the incident signal.

Example 34

The method of operating the first CN (601) of EXAMPLE 33,
wherein the property of the incident signal comprises a polarization of the incident signal, and/or
wherein the property of the incident signal comprises an input spatial direction of the incident signal.

Example 35

The method of operating the first CN (601) of EXAMPLE 33 or 34,
wherein the RRD (603) comprises a plurality of reflective elements, in particular polarized reflective elements.

Example 36

The method of operating the first CN (601) of EXAMPLE 35,
wherein disjoint subsets of the reflective elements of the RRD (603) are associated with the multiple spatial polarization filterings.

Example 37

The method of operating the first CN (601) of EXAMPLE 36,
wherein orthogonally polarized reflective elements of the RRD (603) are associated with different subsets.

Example 38

The method of operating the first CN (601) of any one of EXAMPLEs 33 to 37, the method further comprising
obtaining, from the second CN (602), a message (661) for configuring the RRD (603) to transmit an incident signal from the first CN (601) to the second CN (602) with an output polarization depending on the property of the incident signal.

Example 39

The method of operating the first CN (601) of any one of EXAMPLEs 33 to 38, the method further comprising
providing, to the second CN (602), a message (672) indicative of an or the output polarization used for transmitting, by the RRD (603), an incident signal from the first CN (601), to the second CN (602).

Example 40

A method of operating a second communication node, CN, (602),
wherein the second CN (602) is configured to communicate with a first CN (601) via
a re-configurable relaying device, RRD, (603), in particular a re-configurable reflective device, the RRD (603) being reconfigurable to provide multiple contemporaneous spatial polarization filterings, each one of the multiple spatial polarization filterings being associated with a respective input spatial direction from which incident signals on a radio channel are accepted and with a respective output spatial direction into which the incident signals are transmitted, in particular reflected, by the RRD (603), the method comprising
obtaining, from a first CN (601), a message (652) indicative of the RRD (603) being configurable to transmit an incident signal from the first CN (602) in an output spatial direction to the second CN (602) with an output polarization depending on a property of the incident signal.

Example 41

The method of operating the second CN (602) of EXAMPLE 40,
wherein the property of the incident signal comprises a polarization of the incident signal, and/or
wherein the property of the incident signal comprises an input spatial direction of the incident signal.

Example 42

The method of operating the second CN (602) of EXAMPLE 40 or 41,
wherein the RRD (603) comprises a plurality of reflective elements, in particular polarized reflective elements.

Example 43

The method of operating the second CN (602) of EXAMPLE 42,
wherein disjoint subsets of the reflective elements of the RRD (603) are associated with the multiple spatial polarization filterings.

Example 44

The method of operating the second CN (602) of EXAMPLE 43,
wherein orthogonally polarized reflective elements of the RRD (603) are associated with different subsets.

Example 45

The method of operating the second CN (602) of EXAMPLE any one of EXAMPLEs 40 to 44, the method further comprising
providing, to the first CN (601), a message (661) for configuring the RRD (603) to transmit an incident signal from the first CN (601) to the second CN (602) with an output polarization depending on the property of the incident signal.

Example 46

The method of operating the second CN (602) of any one of EXAMPLEs 40 to 45, the method further comprising
obtaining, from the first CN (601), a message (672) indicative of a first output polarization of an incident signal originating from the first CN (601) and being transmitted, by the RRD (603), to the second CN (602).

Example 47

The method of operating the second CN (602) of any one of EXAMPLEs 40 to 46, the method further comprising
  obtaining, from the first CN (601), a message (672) indicative of the RRD (603) selectively using a or the first output polarization and/or a second output polarization depending on the property of the incident signal.

Example 48

The method of operating the second CN (602) of any one of EXAMPLEs 40 to 47, the method further comprising
  receiving, on the radio channel, a first communication signal (682) having a or the first polarization corresponding to an output polarization of an incident signal, transmitted by the RRD, originating from the first CN (601).

Example 49

The method of operating the second CN (602) of EXAMPLE 48, the method further comprising
  receiving, on the radio channel, a second communication signal (684) having a second polarization corresponding to an output polarization of an incident signal, transmitted by the RRD, originating from a or the third CN, wherein the first polarization and the second polarization are different, in particular orthogonal.

Example 50

A method of operating a re-configurable relaying device, RRD, (603), in particular a re-configurable reflective device, the RRD (603) being reconfigurable to provide multiple contemporaneous spatial polarization filterings, each one of the multiple spatial polarization filterings being associated with a respective input spatial direction from which incident signals on a radio channel are accepted and with a respective output spatial direction into which the incident signals are transmitted, in particular reflected, by the RRD (603), the method comprising
  providing, to a first communication node, CN, (601) a message (661) indicative of the RRD (603) being configured to transmit an incident signal from the first CN (601) in output spatial direction to a second CN (602) with an output polarization depending on a property of the incident signal.

Example 51

The method of operating the RRD (603) of EXAMPLE 50,
  wherein the property of the incident signal comprises a polarization of the incident signal, and/or
  wherein the property of the incident signal comprises an input spatial direction of the incident signal.

Example 52

The method of operating the RRD (603) of EXAMPLE 50 or 51,
  wherein the RRD (603) comprises a plurality of reflective elements, in particular polarized reflective elements.

Example 53

The method of operating the RRD (603) of EXAMPLE 52,
  wherein disjoint subsets of the reflective elements of the RRD (603) are associated with the multiple spatial polarization filterings.

Example 54

The method of operating the RRD (603) of EXAMPLE 53,
  wherein orthogonally polarized reflective elements of the RRD (603) are associated with different subsets.

Example 55

The method of operating the RRD (603) of any one of EXAMPLEs 50 to 54, the method further comprising
  configuring the RRD (603) to transmit an incident signal using an output polarization depending on the property of the incident signal being indicative of the incident signal originating from the first CN in response to at least one of
  obtaining, from the first CN, a message (662) for configuring the RRD (603) to transmit an incident signal using an output polarization depending on a property of the incident signal being indicative of the incident signal originating from the first CN, and
  observing, by the RRD (603), that the RRD (603) is to receive incident signals from the first CN and a third CN.

Example 56

The method of operating the RRD (603) of any one of EXAMPLEs 50 to 55, the method further comprising
  accepting, on the radio channel, a first communication signal and transmitting the first communication signal using a first output polarization being indicative of the first communication signal to originate from the first CN (601),
and/or
  accepting, on the radio channel, a second communication signal and transmitting the second communication signal using a second output polarization being indicative of the second communication signal to originate from a or the third CN (604).

Example 57

A first communication node, CN, (601),
  wherein the first CN (601) is configured for controlling a re-configurable relaying device, RRD, (603), in particular a re-configurable reflective device, the RRD (603) being reconfigurable to provide multiple contemporaneous spatial polarization filterings, each one of the multiple spatial polarization filterings being associated with a respective input spatial direction from which incident signals on a radio channel are accepted and with a respective output spatial direction into which the incident signals are transmitted, in particular reflected, by the RRD (603),
  wherein the first CN (601) comprises control circuitry causing the first CN
  to provide, to a second CN (602), a message (612) indicative of the RRD (603) being configurable to transmit an incident signal from a second CN (602) using an output spatial direction to the first CN (601) depending on a property of the incident signal.

Example 58

A first communication node, CN, (601),
wherein the first CN (601) is configured for controlling a re-configurable relaying device, RRD, (603), in particular a re-configurable reflective device, the RRD (603) being reconfigurable to provide multiple contemporaneous spatial polarization filterings, each one of the multiple spatial polarization filterings being associated with a respective input spatial direction from which incident signals on a radio channel are accepted and with a respective output spatial direction into which the incident signals are transmitted, in particular reflected, by the RRD (603),
wherein the first CN (601) comprises control circuitry causing the first CN (601)
providing, to a second CN (602), a message (652) indicative of the RRD (603) being configurable to transmit an incident signal from the first CN (602) in an output spatial direction to the second CN (602) with an output polarization depending on a property of the incident signal.

Example 59

A first communication node, CN, (601), in particular the first CN (601) of EXAMPLE 57 or the first CN (601) of EXAMPLE 58,
wherein a or the control circuitry of the first CN (601) is configured for causing the CN (601) to perform the method of any one of EXAMPLEs 1 to 10 and/or the method of any one of EXAMPLEs 33 to 39.

Example 60

A second communication node, CN, (602),
wherein the second CN (602) is configured to communicate with a first CN (601) via a re-configurable relaying device, RRD, (603), in particular a re-configurable reflective device, the RRD (603) being reconfigurable to provide multiple contemporaneous spatial polarization filterings, each one of the multiple spatial polarization filterings being associated with a respective input spatial direction from which incident signals on a radio channel are accepted and with a respective output spatial direction into which the incident signals are transmitted, in particular reflected, by the RRD (603),
wherein the second CN (602) comprises control circuitry (172) causing the second CN (402)
to obtain, from the first CN (101), a message (612) indicative of the RRD (103) being configurable to transmit an incident signal from the second CN (102) using an output spatial direction to the first CN (102) depending on a property of the incident signal.

Example 61

A second communication node, CN, (602),
wherein the second CN (602) is configured to communicate with a first CN (601) via
a re-configurable relaying device, RRD, (603), in particular a re-configurable reflective device, the RRD (603) being reconfigurable to provide multiple contemporaneous spatial polarization filterings, each one of the multiple spatial polarization filterings being associated with a respective input spatial direction from which incident signals on a radio channel are accepted and with a respective output spatial direction into which the incident signals are transmitted, in particular reflected, by the RRD (603),
wherein the second CN (602) comprises control circuitry (causing the second CN (502)
obtaining, from a first CN (601), a message (652) indicative of the RRD (603) being configurable to transmit an incident signal from the first CN (602) in an output spatial direction to the second CN (602) with an output polarization depending on a property of the incident signal.

Example 62

A second communication node, CN, (602), in particular the second CN (602) of EXAMPLE 60 or 61,
wherein a or the control circuitry of the second CN (602) is configured for causing the second CN (602) to perform the method of any one of EXAMPLEs 11 to 25 and/or the method of any one of EXAMPLEs 40 to 49.

Example 63

A re-configurable relaying device, RRD, (603), in particular a re-configurable reflective device, the RRD (603) being reconfigurable to provide multiple contemporaneous spatial polarization filtering, each one of the multiple spatial polarization filterings being associated with a respective input spatial direction from which incident signals on a radio channel are accepted and with a respective output spatial direction into which the incident signals are transmitted, in particular reflected, by the RRD (603),
wherein the RRD (603) comprises control circuitry causing the RRD (603)
to provide, to a first CN (601), a message (611) indicative of the RRD (603) being configurable to transmit an incident signal from a second CN (602) using an output spatial direction to the first CN (601) depending on the input polarization of the incident signal.

Example 64

A re-configurable relaying device, RRD, (603), in particular a re-configurable reflective device, the RRD (603) being reconfigurable to provide multiple contemporaneous spatial polarization filtering, each one of the multiple spatial polarization filterings being associated with a respective input spatial direction from which incident signals on a radio channel are accepted and with a respective output spatial direction into which the incident signals are transmitted, in particular reflected, by the RRD (603),
wherein the RRD (603) comprises control circuitry causing the RRD (603)
to provide, to a first communication node, CN, (601) a message (671) indicative of the RRD (603) being configured to transmit an incident signal from the first CN (601) in output spatial direction to a second CN (602) with an output polarization depending on a property of the incident signal.

Example 65

A re-configurable relaying device, RRD, (603), in particular a re-configurable reflective device, the RRD (603)

being reconfigurable to provide multiple contemporaneous spatial polarization filtering, each one of the multiple spatial polarization filterings being associated with a respective input spatial direction from which incident signals on a radio channel are accepted and with a respective output spatial direction into which the incident signals are transmitted, in particular reflected, by the RRD (603), in particular the RRD (603) of EXAMPLE 63 or EXAMPLE 64, wherein a or the control circuitry of the RRD (603) causes the RRD (603) to perform the method of any one of EXAMPLEs 27 to 33 and/or the method of any one of EXAMPLEs 50 to 56.

The invention claimed is:

1. A method of operating a first communication node (CN), wherein the first CN is configured for controlling
a re-configurable relaying device (RRD), the RRD being reconfigurable to provide multiple contemporaneous spatial polarization filterings, each one of the multiple spatial polarization filterings being associated with a respective input spatial direction from which incident signals on a radio channel are accepted and with a respective output spatial direction into which the incident signals are transmitted by the RRD, the method comprising
providing, to a second CN, a message indicative of the RRD—being configurable to transmit an incident signal from a second CN using an output spatial direction to the first CN depending on a property of the incident signal.

2. The method of operating the first CN of claim 1,
wherein the property of the incident signal comprises a polarization of the incident signal, and/or
wherein the property of the incident signal comprises an input spatial direction of the incident signal.

3. The method of operating the first CN of claim 1, wherein the RRD comprises a plurality of reflective elements.

4. The method of operating the first CN of claim 3,
wherein disjoint subsets of the reflective elements of the RRD are associated with the multiple spatial polarization filterings.

5. The method of operating the first CN of claim 4,
wherein orthogonally polarized reflective elements of the RRD are associated with different subsets.

6. The method of operating the first CN of claim 1, the method further comprising
obtaining, from the second CN, a message for configuring the RRD to transmit an incident signal using the output spatial direction to the first CN-depending on the property of the incident signal.

7. The method of operating the first CN of claim 1, the method further comprising
providing, to the RRD, a message for configuring the RRD-to transmit an incident signal using the output spatial direction to the first CN depending on the property of the incident signal.

8. The method of operating the first CN of claim 1, the method further comprising
providing, to the second CN, a message indicative of a property of an incident signal for the incident signal to be transmitted, by the RRD, in the output spatial direction to the first CN.

9. The method of operating the first CN of claim 1, the method further comprising
providing, to the second CN, a message indicative of the RRD being configured for selectively transmitting an incident signal using an output spatial direction to the first CN or an output spatial direction to a third CN depending on the property of the incident signal.

10. The method of operating the first CN of claim 1, the method further comprising
obtaining, from the RRD, a message indicative of the RRD—being configured to transmit an incident signal using an output spatial direction to the first CN depending on the property of the incident signal.

11. A first communication node (CN),
wherein a control circuitry of the first CN is configured for causing the CN to perform the method of claim 1.

12. A method of operating a second communication node (CN),
wherein the second CN is configured to communicate with a first CN via a re-configurable relaying device (RRD), the RRD being reconfigurable to provide multiple contemporaneous spatial polarization filterings, each one of the multiple spatial polarization filterings being associated with a respective input spatial direction from which incident signals on a radio channel are accepted and with a respective output spatial direction into which the incident signals are transmitted by the RRD, the method comprising
obtaining, from the first CN, a message indicative of the RRD being configurable to transmit an incident signal from the second CN using an output spatial direction to the first CN depending on a property of the incident signal.

13. The method of operating the second CN of claim 12, the method further comprising
transmitting, on the radio channel, a first communication signal using a first polarization corresponding to the property of the incident signal for the incident signal accepted by the RRD to be transmitted, by the RRD, using the output spatial direction to the first CN.

14. The method of operating the second CN of claim 13, the method further comprising
transmitting, on the radio channel, a second communication signal using a second polarization corresponding to the property of the incident signal for the incident signal accepted by the RRD to be transmitted, by the RRD, using an output spatial direction to a third CN.

15. The method of operating the second CN of claim 14,
wherein the first polarization, the second polarization and the third polarization are linear polarizations and the third polarization lies between the first polarization and the second polarization.

16. The method of operating the second CN of claim 13, the method further comprising
transmitting, on the radio channel, a third communication signal using a third polarization,
wherein the first polarization and the third polarization are different and non-orthogonal.

17. A second communication node (CN),
wherein a control circuitry of the second CN is configured for causing the second CN to perform the method of claim 12.

18. A method of operating a re-configurable relaying device (RRD), the RRD being reconfigurable to provide multiple contemporaneous spatial polarization filtering, each one of the multiple spatial polarization filterings being associated with a respective input spatial direction from which incident signals on a radio channel are accepted and with a respective output spatial direction into which the incident signals are transmitted by the RRD, the method comprising providing, to a first CN, a message indicative of the RRD being configurable to transmit an incident signal from a second CN using an output spatial direction to the first CN depending on the input polarization of the incident signal.

19. A re-configurable relaying device (RRD), in particular a re-configurable reflective device, the RRD being reconfigurable to provide multiple contemporaneous spatial polarization filtering, each one of the multiple spatial polarization filterings being associated with a respective input spatial direction from which incident signals on a radio channel are accepted and with a respective output spatial direction into which the incident signals are transmitted, in particular reflected, by the RRD, wherein a control circuitry of the RRD causes the RRD to perform the method of claim 18.

* * * * *